US012436227B2

(12) United States Patent
Ossowski et al.

(10) Patent No.: US 12,436,227 B2
(45) Date of Patent: Oct. 7, 2025

(54) METHODS AND APPARATUS TO ADJUST TIME DIFFERENCE OF ARRIVAL DISTANCE VALUES USED FOR SOURCE LOCALIZATION

(71) Applicant: Intel Corporation, Santa Clara, CA (US)

(72) Inventors: Jacek Ossowski, Gdansk (PL); Marek Dabek, Gdansk (PL); Pawel Obszarski, Gdansk (PL); Krzysztof Pawlak, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 868 days.

(21) Appl. No.: 17/483,639

(22) Filed: Sep. 23, 2021

(65) Prior Publication Data

US 2022/0011400 A1   Jan. 13, 2022

(51) Int. Cl.
*G01S 5/30* (2006.01)
*G01S 5/20* (2006.01)
*G01S 5/22* (2006.01)
*G01S 7/539* (2006.01)
*G01S 15/87* (2006.01)

(52) U.S. Cl.
CPC .................. *G01S 5/30* (2013.01); *G01S 5/20* (2013.01); *G01S 5/22* (2013.01); *G01S 7/539* (2013.01); *G01S 15/876* (2013.01)

(58) Field of Classification Search
CPC ..... G01S 5/30; G01S 5/20; G01S 5/22; G01S 7/539; G01S 15/876; G01S 5/18

USPC ......................................................... 367/118
See application file for complete search history.

(56) References Cited

U.S. PATENT DOCUMENTS

2021/0329373 A1   10/2021   Pawlak

OTHER PUBLICATIONS

Canclini et al. ("A robust and low-complexity source localization algorithm for asynchronous distributed microphone networks." IEEE/ACM Transactions on Audio, Speech, and Language Processing 23.10 (2015): 1563-1575.) (Year: 2015).*

(Continued)

*Primary Examiner* — Yuqing Xiao
*Assistant Examiner* — Christopher Richard Walker
(74) *Attorney, Agent, or Firm* — Hanley, Flight & Zimmerman, LLC

(57) ABSTRACT

Methods, apparatus, systems, and articles of manufacture to determine a location of an audio source are disclosed. Disclosed example apparatus are to determine respective error values for corresponding ones of a first dataset of time difference of arrival (TDOA) distance values between pairs of acoustic sensors, the error values based on a cost function, a first set of constraints and a second set of constraints. Disclosed example apparatus are also to adjust the corresponding ones of the first dataset of TDOA distance values based on the respective error values to determine a second dataset of TDOA distance values. Disclosed example apparatus are further to output the second dataset of TDOA distance values to source location circuitry that is to determine the location of the audio source.

25 Claims, 10 Drawing Sheets

(56) References Cited

OTHER PUBLICATIONS

Thyssen et al. ("A novel Time-Delay-of-Arrival estimation technique for multi-microphone audio processing." 2015 IEEE International Conference on Acoustics, Speech and Signal Processing (ICASSP). IEEE, 2015.) which discloses methods for estimating TDOA values in a multi-microphone network (Year: 2015).*
Liu et al. ("Research on acoustic source localization using time difference of arrival measurements." Proceedings of 2012 International Conference on Measurement, Information and Control. vol. 1. IEEE, 2012.) which discloses methods for acoustic sound source localization using TDOA measurements (Year: 2012).*
Gillette et al. ("A linear closed-form algorithm for source localization from time-differences of arrival." IEEE Signal Processing Letters 15 (2008): 1-4.) which discloses an algorithm for sound source localization using TDOA values (Year: 2018).*
Da Silva et al. ("FPGA-based architectures for acoustic beamforming with microphone arrays: Trends, challenges and research opportunities." Computers 7.3 (2018): 41.) (Year: 2018).*
Smith et al. ("The Spherical Interpolation Method of Source Localization", IEEE Journal of Oceanic Engineering, vol. OE-12, No. 1, Jan. 1987) (Year: 1987).*
Sundar et al. ("TDOA-based multiple acoustic source localization without association ambiguity." IEEE/ACM Transactions on Audio , Speech, and Language Processing 26.11 (2018): 1976-1990.) (Year: 2018).*
Schau et al., "Passive source localization employing intersecting spherical surfaces from time-of-arrival differences," IEEE Transactions on Acoustics, Speech, and Signal Processing, vol. ASSP-35, No. 8, Aug. 1987, pp. 1223-1225.

* cited by examiner

US 12,436,227 B2

METHODS AND APPARATUS TO ADJUST TIME DIFFERENCE OF ARRIVAL DISTANCE VALUES USED FOR SOURCE LOCALIZATION

FIELD OF THE DISCLOSURE

This disclosure relates generally to source localization and, more particularly, to methods and apparatus to adjust time difference of arrival distance values used for source localization.

BACKGROUND

In recent years, passive source localization has become increasingly useful for a wide variety of applications, including autonomous driving, surveillance systems, robotics, smart-cities, etc. Some passive source localization techniques rely on time difference of arrival (TDOA) calculations between pairs of sensors. The calculated TDOA values may be input into a source location algorithm to determine the physical location of a signal source.

BRIEF DESCRIPTION OF THE DRAWINGS

The figures are not to scale. In general, the same reference numbers will be used throughout the drawing(s) and accompanying written description to refer to the same or like parts.

Figure 1:
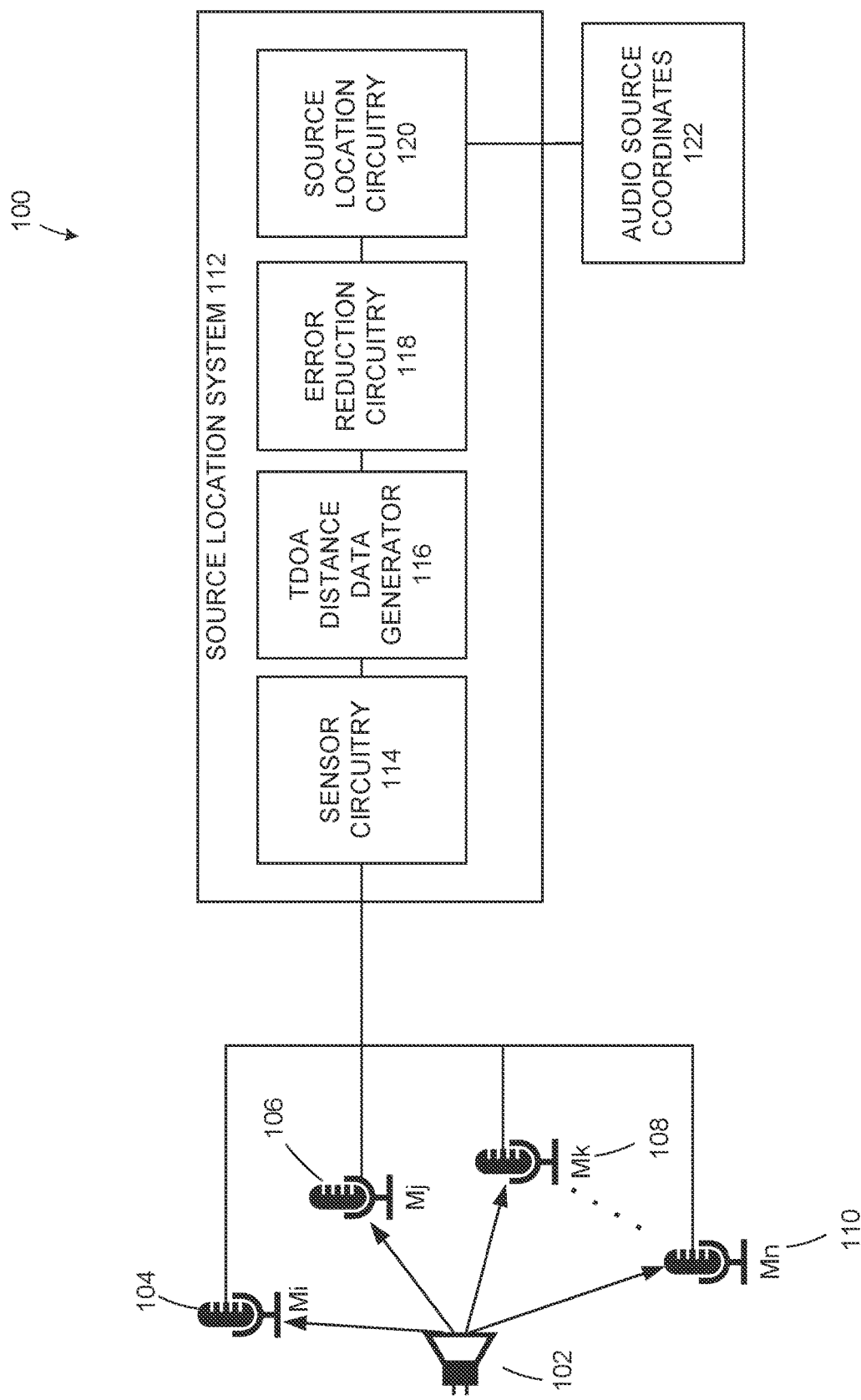
FIG. 1 is a block diagram of an example environment including an example source location system to determine a location of an audio source in accordance with teachings of the disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Passive source localization can be used to determine a location of a signal source in three-dimensional space. Passive source localization methods can be applied to determine a location of a source of several types of propagating signals including audio signals, radio signals, optical signals, digital signals, etc. Accordingly, passive source localization has numerous applications, including radar, sonar, Global Positioning Systems (GPS), wireless communication, electronic surveillance, etc., with more applications emerging every day.

Some passive source localization techniques are based on algorithms that rely on differences in time of arrival of a signal between pairs of sensors. A challenge in such algorithms can be accurately calculating time difference of arrival (TDOA) data between the pairs of sensors. Existing techniques for calculating TDOA values, including Generalized Cross Correlation with Phase Transform (GCC-Phat) and audio stream correlations, can be prone to errors, especially in cases of noisy and/or reverberant environments. Inputting such error-prone TDOA data into a passive source localization algorithm may return erroneous results. In some situations, the calculated TDOA data may not satisfy one or more theoretical mathematical properties. Further, some passive source localization algorithms may be unable to converge to solution when such error-prone TDOA data is input to the algorithms. Accordingly, more accurate TDOA values may result in more accurate source location coordinates.

Example apparatus and methods disclosed herein calculate a location of a signal source using TDOA data based on signal information received at multiple sensors. Examples disclosed herein apply linear programming and/or non-linear programming algorithms to determine error values to be used to adjust a calculated first dataset of TDOA distance values to create a second dataset of TDOA distance values. The second dataset of TDOA distance values may correspond to an error-reduced TDOA distance dataset. In some examples disclosed herein, the second dataset of TDOA distance values may be input into a passive source localization algorithm to determine coordinates of a signal source. Examples disclosed herein may be applied to calculate more accurate TDOA data. Accordingly, examples disclosed herein may provide a more accurate estimated signal source location. In some examples disclosed herein, the applied methods and apparatus reduce random errors associated with calculated TDOA data.

Examples disclosed herein are described and illustrated in terms of determining a location of source of an audio signal. Examples disclosed herein may be applied to determine a location of an audio source in dispersed or concentrated audio sensor systems. In some examples, methods and apparatus disclosed herein improve passive source localization of audio signals. In some examples, apparatus and methods disclosed herein involve less power and processing resources to determine a location of a signal source.

While methods, apparatus, system, and articles of manufacture disclosed herein are described in the context of determining the location of an audio source, the methods, apparatus, system, and articles of manufacture disclosed herein may be applied additionally and/or alternatively to determine a location of any suitable propagating signal, including radio waves, light signals, etc. Methods, apparatus, system, and articles of manufacture disclosed herein may be applied to any technique that relies on TDOA distance values to determine a location of a signal source.

FIG. 1 is a schematic illustration of an example environment 100 in which a location of an audio source 102 is determined in accordance with the teachings of this disclosure. The environment 100 includes an example audio source 102, multiple example sensors 104-110, and an example source location system 112 implemented in accordance with teachings of this disclosure. In the illustrated example, the audio source 102 is an acoustic speaker. However, the audio source 102 may correspond to anything capable of generating an audio signal, including a person, an animal, a cell-phone, etc. The example audio source 102 transmits an audio signal, which is captured at the sensors $M_i$ 104, $M_j$ 106, $M_k$ 108, and $M_n$ 110. The example sensors 104, 106, 108, 110 in this example are microphones. However, any sensor capable of capturing an audio signal may be used additionally and/or alternatively. In examples disclosed herein, the number of sensors (n) exceeds 3 (e.g., n>3). The example sensors 104-110 may be distributed freely in three-dimensional space. However, the configuration of the sensors 104-110, including their respective physical locations, are provided to the source location system 112. In some examples, the microphones are not co-planar. The example sensors 104-110 are communicatively coupled to the example source location system 112. In some examples, the sensors 104-110 reside within a housing including the source location system 112. In some examples, the sensors 104-110 are external to the source location system 112, capture the audio signal from the audio source 102, and transmit the captured signal information to the source location system 112. In some examples, the sensors 104-110 are connected with the source location system 112 via a synchronized interface.

The source location system 112 of FIG. 1 includes example sensor circuitry 114, an example TDOA distance data generator 116, example error reduction circuitry 118, and example source location circuitry 120. The sensor circuitry 114 retrieves and/or receives captured signal information from the sensors 104-110. In the illustrated example, the captured signal information is supplied by the sensor circuitry 114 to the example TDOA distance data generator 116. The TDOA distance data generator 116 generates a first dataset of TDOA distance values, which is supplied to the example error reduction circuitry 118. The error reduction circuitry 118 applies a linear programming algorithm and/or a non-linear programming algorithm to the first dataset of TDOA distance values to adjust the TDOA distance values based on respective error values in accordance with the teachings of this disclosure. For example, the error reduction circuitry 118 estimates error values based on a cost function, a first set of constraints, and a second set of the constraints. The particular cost function and first and second sets of constraints depend on whether a linear programming algorithm or a non-linear programming algorithm is selected. The error reduction circuitry 118 generates a second dataset of error-reduced TDOA distance values by adding respective error values to corresponding ones of the first dataset of TDOA distance values. In some examples, an error value represents a difference between a theoretical delay of a signal captured at a pair of sensors and a respective calculated delay of the signal captured at the pair of sensors. However, in such examples the theoretical delay of a signal captured at a pair of sensors is not known because the source location is unknown. Accordingly, in examples disclosed herein, an error value represents a difference between the calculated delay of the signal captured at the pair of sensors and a respective error-reduced calculated delay that is output by the error reduction circuitry 118. In such examples, each error value may represent an adjustment to a corresponding calculated TDOA value such that the adjusted TDOA values for the different pairs of the sensors yield a collection of TDOA values that are collectively consistent across the overall group of sensors.

The error reduction circuitry 118 outputs the second dataset of TDOA distance values to the example source location circuitry 120. The source location circuitry 120 applies an appropriate source location technique or combination of techniques to the second dataset to determine the location of the audio signal source 102. In the illustrated example, the source location circuitry 120 outputs audio source location coordinates 122 corresponding to an estimated location of the audio source 102.

Figure 2:
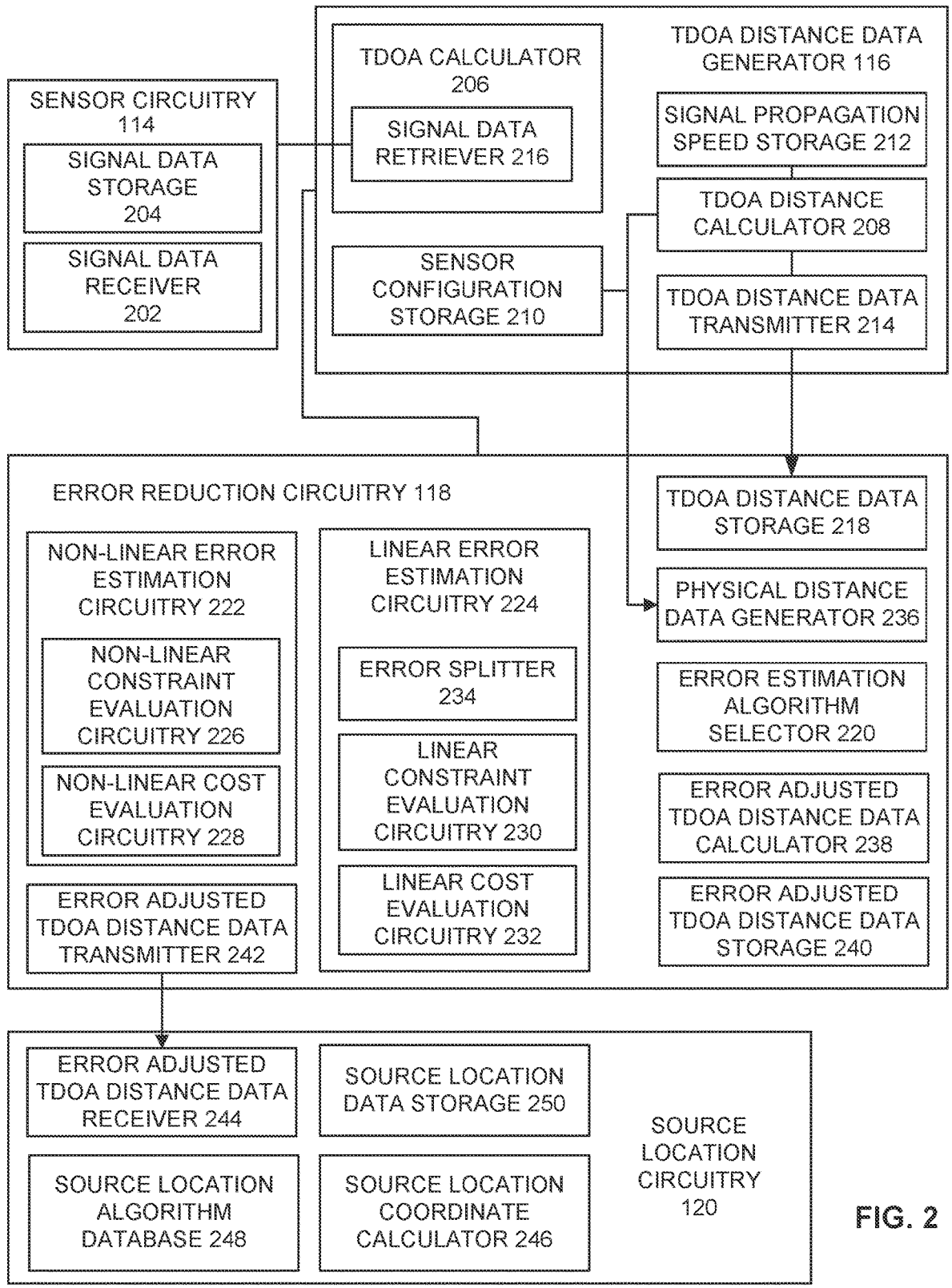
FIG. 2 is a block diagram of an example implementation of the example source location system of FIG. 1.

FIG. 2 is a block diagram of the example the source location system 112 of FIG. 1. In this example, the source location system 112 is described in the context of determining a location of an audio source (e.g., audio source 102) based on audio signal information received at multiple acoustic sensors. However, the source location system 112 can be applied to determine a location of any suitable signal source captured at any respectively suitable sensors. As illustrated in FIG. 1 and FIG. 2, the example the source location system 112 includes example sensor circuitry 114, the example TDOA distance data generator 116, the example error reduction circuitry 118, and the example source location circuitry 120.

As noted above, the example sensor circuitry 114 of FIGS. 1 and 2 is communicatively coupled to the example acoustic sensors 104-110 FIG. 1. The sensor circuitry 114 includes an example signal data receiver 202 configured to receive and/or retrieve signal data from the sensors 104-110 and store the signal data in the example signal data storage 204. In some examples, the signal data storage 204 is located within the TDOA distance data generator 116. In some examples, the signal data storage 204 is located outside the source location system 112 in a location accessible by the TDOA distance data generator 116. The signal data storage 204 of this example may be implemented by a volatile memory and/or a non-volatile memory (e.g., flash memory). The signal data storage 204 may additionally or alternatively be implemented by one or more double data rate (DDR) memories, such as DDR, DDR2, DDR3, DDR4, mobile DDR (mDDR), etc. The signal data storage 204 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the signal data storage 204 is illustrated as a single datastore, the signal data storage 204 may be implemented by any number and/or type(s) of datastores. Furthermore, the data stored in the signal data storage 204 may be in any data format such as, for example, binary data, comma delimited data, tab delimited data, structured query language (SQL) structures, an executable (e.g., an executable binary, a configuration image, etc.), etc.

The source location system 112 of FIGS. 1 and 2 includes an example TDOA distance data generator 116 constructed to generate TDOA distance data based on the signal information captured by the sensors 104-110. The TDOA distance data generator 116 includes an example TDOA calculator 206, an example TDOA distance calculator 208, example sensor configuration storage 210, example signal propagation speed storage 212, and an example TDOA distance data transmitter 214 that is communicatively coupled to the example error reduction circuitry 118.

The example TDOA calculator 206 is constructed to generate TDOA values based on signal data received at the sensors 104-110. Accordingly, the TDOA calculator 206 includes an example signal data retriever 216 that is communicatively coupled to the sensor circuitry 114. The signal data retriever 216 retrieves the signal data and supplies the signal data to the example TDOA calculator 206. The TDOA calculator 206 calculates TDOA values between pairs of the sensors 104-110 and transmits the TDOA values to the example TDOA distance calculator 208. In some examples, the TDOA calculator 206 is incorporated into the TDOA distance calculator 208. As disclosed herein, a TDOA value represents a difference in arrival time of a signal between a pair of sensors. In other words, a TDOA value represents a time delay of a signal received at one sensor based on when the signal was received at another sensor. A TDOA value is calculated for each pair of sensors 104-110 and transmitted to the TDOA distance calculator 208.

The TDOA distance calculator 208 is constructed to generate a first dataset of TDOA distance values corresponding to respective TDOA values. In this example, the TDOA distance data generator 116 uses a GCCPhat algorithm to calculate the TDOA values and the corresponding TDOA distance values. However, any suitable algorithm to calculate TDOA distance values may be used additionally and/or alternatively. Similar to a TDOA value representing a time delay of a signal received between a pair of sensors, a TDOA distance value represents a distance delay between the pairs of sensors. A TDOA distance value in this example is calculated by multiplying respective ones of the TDOA values by a propagation speed of the signal, such as the speed of sound in this example. Accordingly, the TDOA distance data generator 116 includes example signal propagation speed storage 212. In some examples, the signal propagation speed storage 212 is located within the TDOA distance data generator 116. In some examples, the signal propagation speed storage 212 is located outside the source location system 112 and accessible by the TDOA distance data generator 116. The signal propagation speed storage 212 may be implemented by any memor(ies), storage device(s) and/or storage disc(s) for storing data such as, for example, flash memory, magnetic media, optical media, etc. Furthermore, the data stored in the example signal propagation speed storage 212 may be in any data format such as, for example, binary data, comma delimited data, tab delimited data, structured query language (SQL) structures, image data, etc.

Figure 3:
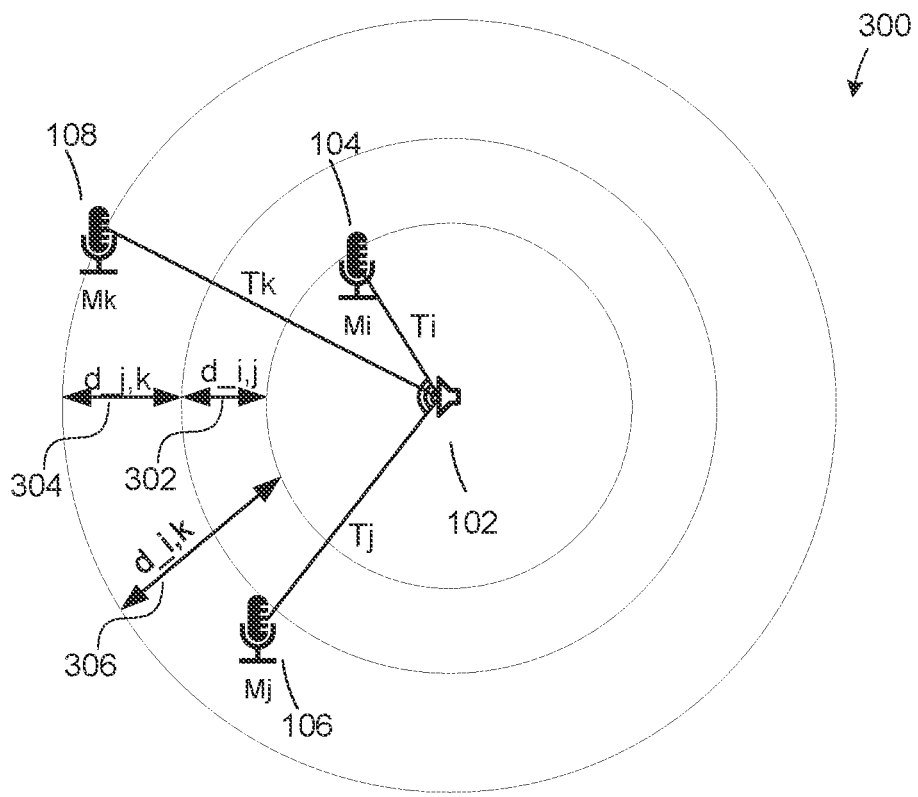
FIG. 3 illustrates an example environment including the example audio source and example sensors of FIG. 1 to provide further understanding of TDOA distance data.

To provide further understanding of the TDOA distance data, FIG. 3 illustrates an example environment 300 including the example sensors 104, 106 and 108 used by the source location system 112. The example environment 300 includes the example audio source 102. In the illustrated example of FIG. 3, three concentric circles are depicted with the audio source 102 at the center. The circles are included to assist in visualizing the TDOA distance values. The environment 300 includes the three sensors: Mi 104, Mj 106, and Mk 108. The circles assist in understanding that the same audio signal propagating from the source 102 reaches sensor Mi 104, Mj 106, and Mk 108 at different times based on the distance between each sensor and the audio source 102. As noted above, a TDOA value represents a time difference of arrival of a signal between a pair of sensors. As illustrated in FIG. 3, a signal leaves audio source 102 and reaches sensor Mi at time Ti, reaches sensor Mj at time Tj, and reaches sensor Mk at time Tk. Accordingly, a TDOA value for sensors Mi and Mj represents a difference between a first amount of time it took for a signal to reach sensor Mj from the audio source 102 and a second amount of time it took for the same signal to reach sensor Mi. The time delay of the signal after it reaches Mi until it reaches Mj can be represented as "$T\_i,j = Tj - Ti$." Similarly, the time delay of the signal after reaches Mj until it reaches Mk can be represented as "$T\_j,k = Tk - Tj$." Finally, the time delay of the signal after it reaches Mi until it reaches Mk can be represented as "$T\_i,j = Tk - Ti$."

As noted above, a TDOA distance value represents a distance corresponding to the delay of arrival of a signal between a pair of sensors. That is, a TDOA distance value represents a difference between the distances from the audio source 102 to each of the sensors Mi 104, Mj 106, and Mk 108, which are determined based on the TDOA values without having to know the actual location of the audio source 102. A TDOA distance value between sensors Mi 104 and Mj 106 is illustrated in FIG. 3 as d_i,j 302. The delay distance d_i,j 302 is calculated by multiplying the time delay between the two sensors (i.e., T_i,j=Tj−Ti) by a propagation speed of the signal (e.g., the speed of sound, Vs). Accordingly, the TDOA value d_i,j 302 can be represented as "d_i,j=Vs*(Tj−Ti)." Similarly, a TDOA distance value between sensor Mj 106 and Mk 108 is illustrated in FIG. 3 as d_j,k 304. The delay distance d_j,k 304 can be represented as "d_j,k=Vs*(Tk−Tj)." A TDOA distance value between sensor Mi 104 and sensor Mk 108 is illustrated in FIG. 3 as d_i,k 306. The delay distance d_i,k 306 can be represented as "d_i,k=Vs*(Tk−Ti)." A TDOA distance dataset for an environment includes a respective TDOA distance value for each pair of sensors included in the environment.

Referring again to FIG. 2, the TDOA distance data generator 116 includes example sensor configuration storage 210. In some examples, a configuration of the sensors 104-110 must be known to determine the TDOA distance values. Accordingly, the TDOA distance calculator 208 is communicatively coupled to the sensor configuration storage 210. The sensor configuration storage 210 of this example may be implemented by a volatile memory and/or a non-volatile memory (e.g., flash memory). The sensor configuration storage 210 may additionally or alternatively be implemented by one or more double data rate (DDR) memories, such as DDR, DDR2, DDR3, DDR4, mobile DDR (mDDR), etc. The sensor configuration storage 210 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. Furthermore, the data stored in the sensor configuration storage 210 may be in any data format such as, for example, binary data, comma delimited data, tab delimited data, structured query language (SQL) structures, an executable (e.g., an executable binary, a configuration image, etc.), etc.

The TDOA distance data generator 116 also includes an example TDOA distance data transmitter 214 to transmit the first dataset of TDOA distance values corresponding to pairs of the sensors 104-110 to an example TDOA distance data storage 218. In this example, the TDOA distance data storage 218 is located in the example error reduction circuitry 118. In some examples, the TDOA distance data storage 218 is located within the TDOA distance data generator 116. In some examples, the TDOA distance data storage 218 is located outside the source location system 112 and accessible by the error reduction circuitry 118. The TDOA distance data storage 218 may be implemented by any memor(ies), storage device(s) and/or storage disc(s) for storing data such as, for example, flash memory, magnetic media, optical media, etc. Furthermore, the data stored in the example TDOA distance data storage 218 may be in any data format such as, for example, binary data, comma delimited data, tab delimited data, structured query language (SQL) structures, image data, etc.

The example error reduction circuitry 118 of FIGS. 1 and/or 2 is constructed to determine error values corresponding to respective ones of the TDOA distance data. The error reduction circuitry 118 determines error values based on an error reduction algorithm such as a linear programming algorithm and/or a non-linear programming algorithm. Accordingly, the error reduction circuitry 118 includes an example error estimation algorithm selector 220, example non-linear error estimation circuitry 222, and example linear error estimation circuitry 224. The example error estimation algorithm selector 220 selects an error reduction algorithm to operate on the first dataset of TDOA distance values. In some examples, error estimation algorithm selector 220 selects a non-linear error estimation algorithm. In such examples, the first dataset of TDOA distance values is input into the non-linear error estimation circuitry 222. In some examples, the error estimation algorithm selector 220 selects a linear error estimation algorithm. In such examples, the first dataset of TDOA distance values is input into the linear error estimation circuitry 224. Any suitable method for solving a linear error estimation algorithm may be applied. Similarly, any suitable method for solving a non-linear error estimation algorithm may be applied, including simplex method, interior point method, etc. In some examples, the error estimation algorithm selector 220 selects an algorithm based on whether the dataset of TDOA distance values are linearly dependent. In some examples, the error estimation algorithm selector 220 selects a non-linear error estimation algorithm to avoid solving for an absolute function. In some examples, the error estimation algorithm selector 220 selects a non-linear error estimation algorithm to promote interior point error values when using a simplex method and/or an interior method.

The error reduction circuitry 118 determines error values corresponding to respective ones of the TDOA distance values based on a cost function, a first set of constraints, and a second set of constraints. Accordingly, the non-linear error estimation circuitry 222 includes example non-linear constraint evaluation circuitry 226 to evaluate a first set of non-linear constraints and a second set of non-linear constraints, and example non-linear cost evaluation circuitry 228 to evaluate a non-linear cost function. Similarly, the linear error estimation circuitry 224 includes example linear constraint evaluation circuitry 230 to evaluate a first set of linear constraints and a second set of linear constraints, and example linear cost evaluation circuitry 232 to evaluate a linear cost function. The linear error estimation circuitry 224 also includes an example error splitter 234. If the error estimation algorithm selector 220 selects a linear error estimation algorithm, in some examples, the error estimation algorithm selector 220 splits respective ones of the error values into corresponding pairs of component error values. In some examples, the linear error estimation circuitry 224 applies the error splitter 234 to an error value that may take on positive or negative values. In such examples, an error splitter 234 splits the error value that might be negative into two error values that are both non-negative. In some examples, the linear error estimation circuitry 224 applies the error splitter 234 to an error value so that the linear error estimation circuitry 224 is not applied to solve a cost function based on an absolute value. In some examples, the error splitter 234 splitting an error value would be useful if the linear error estimation circuitry 224 is limited to processing positive values.

As an illustrative example, consider a scenario in which the error estimation algorithm selector 220 selects a non-linear error estimation algorithm. However, the following procedure applies similarly if the error estimation algorithm selector 220 selects a linear error estimation algorithm. In response to the error estimation algorithm selector 220 selecting a non-linear error estimation algorithm, the non-linear error estimation circuitry 222 receives the first dataset of TDOA distance values as an input. For each TDOA distance value, a respective error value is output based on a respective error variable. For example, the TDOA distance value d_i,j of FIG. 3, which corresponds to the delay distance between Mi 104 and Mj 106, will have a respective error variable represented by e_i,j. In theory, the ones of the error values represent a difference between a theoretical delay of a signal captured at a pair of sensors and a respective calculated TDOA distance delay of the signal captured at the pair of sensors. For example, a theoretical delay of a signal captured at Mi 104 and Mj 106 may be represented as d*_i,j. In theory, a respective error value may be represented by equation 1 where d*_i,j can be represented as "d*i,j=d_i,k−d_j,k."

$$e_{i,j} = d^*_{i,j} - d_{i,j} \qquad \text{Eq. 1}$$

In reality, however, the ones of the error values represent a difference between a calculated TDOA distance value and a respective error-adjusted TDOA distance value that is output by the error reduction circuitry 118. In some examples in which the error estimation algorithm selector 220 selects a linear error estimation algorithm, as noted above, the error split 234 splits an error value into a corresponding pair of component error values. Such an error value is split by splitting its corresponding error variable into a pair of component error variables. Accordingly, the error variable represented by e_i,j would be split according to equation 2, wherein the corresponding component error variables "e'_i,j" and "e"_i,j" would be non-negative values.

$$e_{i,j} = e'_{i,j} - e''_{i,j} \qquad \text{Eq. 2}$$

In this example, the selected non-linear error estimation algorithm determines the respective error values corresponding to the respective TDOA distance values by solving a respective cost function for ones of the respective error variables based on the first set of non-linear constraints and the second set of non-linear constraints. For example, the non-linear constraint evaluation circuitry 226 evaluates the first set of non-linear constraints and the second set of non-linear constraints.

In the illustrated example, the first set of non-linear constraints are based on combinations of three TDOA distance values. For example, the first set of constraints specifies, as described in further detail below, a relationship between 1) a combination of a first one of the TDOA distance values corresponding to a first delay distance between a first acoustic sensor and a second acoustic sensor, a second one of the TDOA distance values corresponding to a second delay distance between the first acoustic sensor and a third acoustic sensor, and a third one of the TDOA distance values corresponding to a third delay distance between the third acoustic sensor and the second acoustic sensor, with 2) a combination of a first one of the error values corresponding to the first one of the TDOA distance values, a second one of the error values corresponding to the second one of the TDOA distance values, and a third one of the error values corresponding to the third one of the TDOA distance values. For example, a first of the ones of the first set of constraints may be represented as "(d_i,k+e_i,k)−(d_j,k+e_j,k)−(d_i,j+e_i,j)=0."

In some examples, the second set of non-linear constraints are based on physical distances between pairs of the acoustic sensors. For example, the second set of constraints specifies, as described in further detail below, relationships 1) a first combination of a first one of the physical distance values corresponding to a first physical distance between a first acoustic sensor and a second acoustic sensor and a first one of the TDOA distance values corresponding to a first delay distance between the first acoustic sensor and the second acoustic sensor, 2) a first one of the error values corresponding to the first one of the TDOA distance data, and 3) a second combination of the first physical distance and the first one of the TDOA distance values. For example, a first one of the second set of constraint may be represented as "−D_i,j≤(d_i,j+e_i,j)≤D_i,j." Accordingly, the error reduction circuitry 118 includes an example physical distance data generator 236 that is communicatively coupled to the sensor configuration storage 210 of the TDOA distance data generator 116. The sensor configuration storage 210 stores a configuration of the sensors. The configuration of the sensors includes a location of the ones of the sensors. In some examples, coordinates of the ones of the sensors are known. In some examples, a location of the ones of the sensors is known in relation to other ones of the sensors. The physical distance data generator 236 accesses the sensor configuration from the sensor configuration storage 210 and generates data corresponding to physical distances between pairs the pairs of sensors 104-110. The physical distances are determined based on the known configuration of the sensors 104-110.

Figure 4:
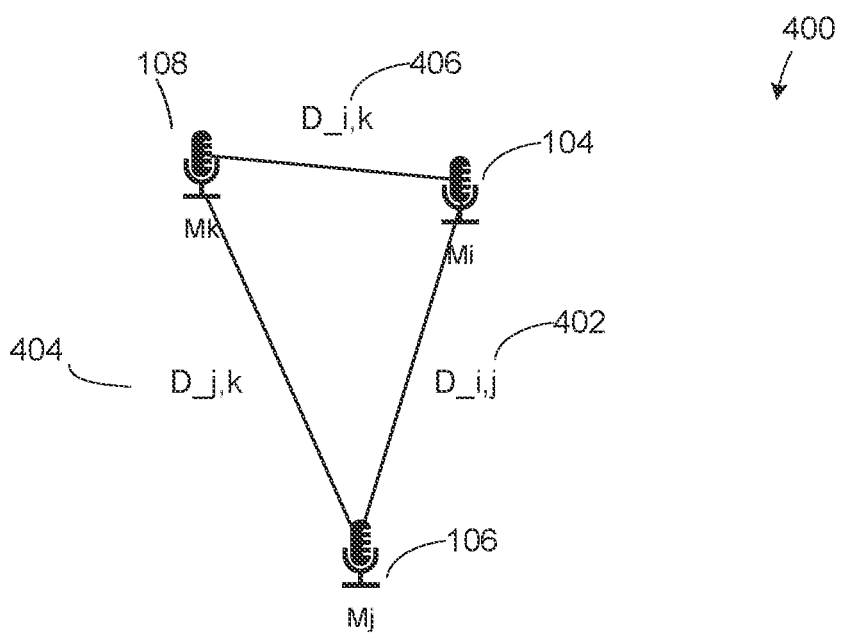
FIG. 4 illustrates an example environment including the example sensors of FIG. 1 to provide further understanding of physical distance data.

To provide further understanding of non-linear constraints, FIG. 4 illustrates an example sensor arrangement 400 of the sensors 104, 106 and 108 included in the example environment 300 of FIG. 3. The sensor arrangement 400 of FIG. 4 illustrates the sensors of FIG. 3 in terms of physical distances between the sensor pairs. A physical distance between sensor Mi 104 and sensor Mj 106 is illustrated in FIG. 4 as D_i,j 402. A physical distance between sensor Mj 106 and sensor Mk 108 is illustrated in FIG. 4 as D_j,k 404. A physical distance between sensor Mi 104 and sensor Mk 108 is illustrated in FIG. 4 as D_i,k 406.

Referring again FIG. 3, the illustrated TDOA distance values 302, 304, 306 should satisfy two types of mathematical properties that can be observed in the illustrated example. The first property specifies that a TDOA distance delay between a pair of sensors (e.g., d_i,j 302) should not exceed a physical distance between the pair of sensors (e.g., D_i,j 402). In other words, an absolute value of d_i,j 302 should be less than or equal to D_i,j 402. Similarly, an absolute value of d_j,k 304 should be less than or equal to D_j,k 404 and an absolute value of d_i,k 306 should be less than or equal to D_i,k 406.

The second mathematical property specifies that a delay distance (e.g., d_i,k 306) between a pair of sensors (Mi and Mk) may be achieved by summing two intermediate distance delays (e.g., d_i,j 302 and d_j,k 304). In other words, delay distance d_i,k 306 should be equal to the sum of d_i,j 302 and d_j,k 304. In an example that has an n number of sensors, an exemplary set of equalities representative of the second mathematical property can be observed in equations 3-9.

$$d_{1,2} + d_{2,3} = d_{1,3} \qquad \text{Eq. 3}$$

$$d_{1,3} + d_{3,4} = d_{1,4} \qquad \text{Eq. 4}$$

$$\vdots$$

$$d_{1n-1} + d_{n-1n} = d_{1,n} \qquad \text{Eq. 5}$$

-continued $$d_{2,3} + d_{3,4} = d_{2,4} \quad \text{Eq. 6}$$

$$d_{2,4} + d_{4,5} = d_{2,5} \quad \text{Eq. 7}$$

$$\vdots$$

$$d_{2n-1} + d_{n-1,n} = d_{2,n} \quad \text{Eq. 8}$$

$$\vdots$$

$$d_{n-2,n-1} + d_{n-1,n} = d_{n-2,n} \quad \text{Eq. 9}$$

In some examples, the two mathematical properties described above form the basis for the first and second sets of constraints used to solve for the error values associated with the TDOA distance values. As described above, the error values are calculated based on a cost function, a first set of constraints, and a second set of constraints. The first set of constraints, as noted above, are based on combinations of three TDOA distance values. The first of constraints are additionally based on the equalities as illustrated in equations 3-9. Specifically, for the ones of the equalities that are generated, respective ones of the first set of constraints are generated. For example, an equality for sensors Mi 104, Mj 106, and Mk 108 may be represented by equation 10.

$$d_{i,j} + d_{j,k} = d_{i,k} \quad \text{Eq. 10}$$

Accordingly, a respective constraint of the first set of constraints may be represented by equation 11.

$$e_{i,j} + e_{j,k} - e_{i,k} = d_{i,k} - d_{i,k} - d_{j,k} \quad \text{Eq. 11}$$

As noted above, the ones of the second set of constraints are based on a TDOA distance value for a pair of acoustic sensors and a physical distance value between the pair of acoustic sensors. Specifically, for the ones of error variables generated, a corresponding one of the second set of constraints is generated. For example, consider the acoustic sensor pair of Mi 104 and Mj 106. An error variable for the pair of acoustic sensors may be represented as e_i,j, as noted above. Further, a TDOA distance value and a physical distance value for the pair of acoustic sensors may be represented as d_i,j and D_i,j, respectively. A corresponding constraint of the second set of constraints may be represented by equation 12.

$$-D_{i,j} - d_{i,j} \leq e_{i,j} \leq D_{i,j} - d_{i,j} \quad \text{Eq. 12}$$

Referring again to FIG. 2, the non-linear error estimation circuitry 222 includes the example non-linear constraint evaluation circuitry 226 and the example non-linear cost evaluation circuitry 228. The non-linear constraint evaluation circuitry 228 evaluates the first set of non-linear constraints and the second set of non-linear constraints as described above and illustrated in FIGS. 3 and 4. The example non-linear cost evaluation circuitry 228 evaluates an example cost function to determine the set of error values associated with the set of TDOA distance values. An example cost function disclosed herein minimizes an error variable (e.g., e_i,j) in order to minimize an error value corresponding to a respective TDOA distance value. Minimizing an error value associated with a TDOA distance value, in some examples, minimizes errors associated with the TDOA distance data and thereby reduces error associated with a calculating a location of the signal source.

An example cost function for the non-linear error estimation circuitry 222 is shown in Equation 13. An example cost function for the linear error estimation circuitry 224 is shown in Equation 14. As noted above, the error variable may be split for the linear cost function in some examples, which results in the example cost function shown in Equation 15. The non-linear error estimation circuitry 222 (or the linear error estimation circuitry 224, if applicable) outputs an error value for corresponding ones of the TDOA distance values of the first dataset.

$$z = \Sigma_{i=1}^{n} \Sigma_{j=i+1}^{n} e_{i,j}^2 \quad \text{Eq. 13}$$

$$z = \Sigma_{i=1}^{n} \Sigma_{j=i+1}^{n} |e_{i,j}| \quad \text{Eq. 14}$$

$$z = \Sigma_{i=1}^{n} \Sigma_{j=i+1}^{n} (e'_{i,j} + e''_{i,j}) \quad \text{Eq. 15}$$

In some examples, solving for the cost function for the decision variable may not be possible. For example, an error value may be too large thereby limiting the ability of the non-linear error estimation circuitry 322 to solve the cost function. In such examples, the non-linear error estimation circuitry 322 provides an output indicating that the location of the audio source cannot be determined.

The error reduction circuitry 118 of FIGS. 1 and/or 2 includes an example error-adjusted TDOA distance data calculator 238. The error-adjusted TDOA distance data calculator 238 inputs TDOA distance data and corresponding error values and outputs a second dataset of error-adjusted TDOA distance values. In doing so, the error-adjusted TDOA distance data calculator 238 adds respective ones of the error values output by the non-linear error estimation circuitry 222 with the corresponding ones of the TDOA distance values. The error adjusted TDOA distance values output by the error-adjusted TDOA distance data calculator 238 are stored in example error-adjusted TDOA distance data storage 240 of the error reduction circuitry 118. The error reduction circuitry 118 also includes an example error-adjusted TDOA distance data transmitter 242 constructed to transmit the calculated error-adjusted TDOA distance data to the example source location circuitry 120.

The example source location system 112 of FIGS. 1 and/or 2 includes the example source location circuitry 120. The example source location circuitry 120 inputs the error-adjusted TDOA distance data into a source location algorithm to determine a location of the signal source. The example source location circuitry 120 includes an example error-adjusted TDOA distance data receiver 244, an example source location calculator 246, an example source location algorithm database 248, and example source location data storage 250.

The example error-adjusted TDOA distance data receiver 244 receives the error-adjusted TDOA distance data from the error adjusted TDOA distance data transmitter 242 of the error reduction circuitry 118. The example source location coordinate calculator 246 inputs the error-adjusted TDOA distance data to determine coordinates of the signal source. In some examples, as described above, the non-linear error estimation circuitry 222 and/or the linear error estimation circuitry 224 may be unable to solve a cost function for an error value. In such examples, the source location circuitry 118 may not be able to determine the location of a signal source. Accordingly, the source location coordinate calculator may output a message declaring that the source location is indeterminate. The source location coordinate calculator 246 selects an appropriate source location algorithm from the example source location algorithm database 248. The example source location algorithm database 248 stores various source location algorithms to be used by the source location coordinate calculator 246. In some examples, the source location algorithm database 248 is located outside the source location circuitry 120. The source location algorithm database 248 of this example may be implemented by a volatile memory and/or a non-volatile memory (e.g., flash memory). The source location algorithm database 248 may additionally or alternatively be implemented by one or more double data rate (DDR) memories, such as DDR, DDR2, DDR3, DDR4, mobile DDR (mDDR), etc. The source location algorithm database 248 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. Furthermore, the data stored in the source location algorithm database 248 may be in any data format such as, for example, binary data, comma delimited data, tab delimited data, structured query language (SQL) structures, an executable (e.g., an executable binary, a configuration image, etc.), etc.

The calculated results of the source location calculator 246 (i.e., the signal source coordinates) are storage in the example source location data storage 250. In some examples, the source location data storage 250 is located outside the source location circuitry 120. The source location data storage 250 of this example may be implemented by a volatile memory and/or a non-volatile memory (e.g., flash memory). The source location data storage 250 may additionally or alternatively be implemented by one or more double data rate (DDR) memories, such as DDR, DDR2, DDR3, DDR4, mobile DDR (mDDR), etc. The source location data storage 250 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. Furthermore, the data stored in the source location data storage 250 may be in any data format such as, for example, binary data, comma delimited data, tab delimited data, structured query language (SQL) structures, an executable (e.g., an executable binary, a configuration image, etc.), etc.

In some examples, the TDOA distance data generator 116 includes means for generating TDOA distance data. For example, the means for generating TDOA distance data may be implemented by the TDOA distance calculator 208. In some examples, the TDOA distance calculator 208 may be implemented by machine executable instructions such as that implemented by at least blocks 502, 506 of FIG. 5 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the TDOA distance calculator 208 is implemented by other hardware logic circuitry, hardware implemented state machines, and/or any other combination of hardware, software, and/or firmware. For example, the TDOA distance calculator 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the error reduction circuitry 118 includes means determining error values. For example, the means for determining error values may be implemented by the non-linear error estimation circuitry 222 and/or the linear error estimation circuitry 224. In some examples, the non-linear error estimation circuitry 222 and/or the linear error estimation circuitry 224 may be implemented by machine executable instructions such as that implemented by at least blocks 504, 508, 510 of FIG. 5, 602-610 of FIG. 6, and/or 702-714 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the non-linear error estimation circuitry 222 and/or the linear error estimation circuitry 224 is implemented by other hardware logic circuitry, hardware implemented state machines, and/or any other combination of hardware, software, and/or firmware. For example, the non-linear error estimation circuitry 222 and/or the linear error estimation circuitry 224 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the TDOA distance data generator 116 and the error reduction circuitry 118 includes means for generating physical distance data. For example, the means for generating physical distance data may be implemented by the physical distance data generator 236 of FIG. 2. In some examples, the physical distance data generator 236 may be implemented by machine executable instructions such as that implemented by at least blocks 504 of FIG. 5, 604 of FIG. 6, 704 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the physical distance data generator 236 is implemented by other hardware logic circuitry, hardware implemented state machines, and/or any other combination of hardware, software, and/or firmware. For example, the physical distance data generator 236 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the error reduction circuitry 118 includes means for generating error-adjusted TDOA distance data. For example, the means for generating error-adjusted TDOA distance data may be implemented by error-adjusted TDOA distance data calculator 238 of FIG. 2. In some examples, the error-adjusted TDOA distance data calculator 238 may be implemented by machine executable instructions such as that implemented by at least blocks 512 of FIG. 5 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the error-adjusted TDOA distance data calculator 238 is implemented by other hardware logic circuitry, hardware implemented state machines, and/or any other combination of hardware, software, and/or firmware. For example, the error-adjusted TDOA distance data calculator 238 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the source location circuitry 120 includes means for determining a location of a signal source. For example, the means for determining a location of a signal source may be implemented by the source location coordinate calculator 246 of FIG. 2. In some examples, the source location coordinate calculator 246 may be implemented by machine executable instructions such as that implemented by at least blocks 514 of FIG. 5 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the source location coordinate calculator 246 is implemented by other hardware logic circuitry, hardware implemented state machines, and/or any other combination of hardware, software, and/or firmware. For example, the source location coordinate calculator 246 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the sensor circuitry 114 of FIG. 1 is illustrated in FIG. 2, one or more of the elements, processes, and/or devices illustrated in FIG. 2 may be combined, divided, re-arranged, omitted, eliminated, and/or implemented in any other way. Further, the example signal data receiver 202, the example signal data storage 204, and/or, more generally, the example sensor circuitry 114 of FIG. 2, may be implemented hardware alone or by hardware in combination with software and/or firmware. Thus, for example, any of the example signal data receiver 202, the example signal data storage 204, and/or, more generally, the example sensor circuitry 114, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example sensor circuitry 114 of FIG. 1 may include one or more elements, processes, and/or devices in addition to, or instead of, those illustrated in FIG. 2, and/or may include more than one of any or all of the illustrated elements, processes and devices.

While an example manner of implementing the example TDOA distance data generator 116 of FIG. 1 is illustrated in FIG. 2, one or more of the elements, processes, and/or devices illustrated in FIG. 2 may be combined, divided, re-arranged, omitted, eliminated, and/or implemented in any other way. Further, the example TDOA calculator 206, the example TDOA distance calculator 208, the example sensor configuration storage 210, the example signal propagation speed storage 212, the example TDOA distance data transmitter 214, the example signal data retriever 216, and/or, more generally, the example TDOA distance data generator 116 of FIG. 2, may be implemented by hardware alone or by hardware in combination with software and/or firmware. Thus, for example, any of the example TDOA calculator 206, the example TDOA distance calculator 208, the example sensor configuration storage 210, the example signal propagation speed storage 212, the example TDOA distance data transmitter 214, the example signal data retriever 216, and/or, more generally, the example TDOA distance data generator 116, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example TDOA distance data generator 116 of FIG. 1 may include one or more elements, processes, and/or devices in addition to, or instead of, those illustrated in FIG. 2, and/or may include more than one of any or all of the illustrated elements, processes and devices.

While an example manner of implementing the example error reduction circuitry 118 of FIG. 1 is illustrated in FIG. 2, one or more of the elements, processes, and/or devices illustrated in FIG. 2 may be combined, divided, re-arranged, omitted, eliminated, and/or implemented in any other way. Further, the example TDOA distance data storage 218, the example error estimation algorithm selector 220, the example non-linear error estimation circuitry 222, the example linear error estimation circuitry 224, the example non-linear constraint evaluation circuitry 226, the example non-linear cost evaluation circuitry 228, the example linear constraint evaluation circuitry 230, the example linear cost evaluation circuitry 232, the example error splitter 234, the example physical distance data generator 236, the example error adjusted TDOA distance calculator 238, the example error adjusted TDOA distance data storage 240, the example error adjusted TDOA distance data transmitter 242, and/or, more generally, the example error reduction circuitry 118 of FIG. 2, may be implemented by hardware alone or by hardware in combination with software and/or firmware. Thus, for example, any of the example TDOA distance data storage 218, the example error estimation algorithm selector 220, the example non-linear error estimation circuitry 222, the example linear error estimation circuitry 224, the example non-linear constraint evaluation circuitry 226, the example non-linear cost evaluation circuitry 228, the example linear constraint evaluation circuitry 230, the example linear cost evaluation circuitry 232, the example error splitter 234, the example physical distance data generator 236, the example error adjusted TDOA distance calculator 238, the example error adjusted TDOA distance data storage 240, the example error adjusted TDOA distance data transmitter 242, and/or, more generally, the example error reduction circuitry 118, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example error reduction circuitry 118 of FIG. 1 may include one or more elements, processes, and/or devices in addition to, or instead of, those illustrated in FIG. 2, and/or may include more than one of any or all of the illustrated elements, processes and devices.

While an example manner of implementing the example source location circuitry 120 of FIG. 1 is illustrated in FIG. 2, one or more of the elements, processes, and/or devices illustrated in FIG. 2 may be combined, divided, re-arranged, omitted, eliminated, and/or implemented in any other way. Further, the example error adjusted TDOA distance data receiver 244, the example source location coordinate calculator 246, the example source location algorithm database 248, the example source location data storage 250, and/or, more generally, the example source location circuitry 120 of FIG. 2, may be implemented by hardware alone or by hardware in combination with software and/or firmware. Thus, for example, any of the example error adjusted TDOA distance data receiver 244, the example source location coordinate calculator 246, the example source location algorithm database 248, the example source location data storage 250, and/or, more generally, the example source location circuitry 120, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example source location circuitry 120 of FIG. 1 may include one or more elements, processes, and/or devices in addition to, or instead of, those illustrated in FIG. 2, and/or may include more than one of any or all of the illustrated elements, processes and devices.

Figure 5:
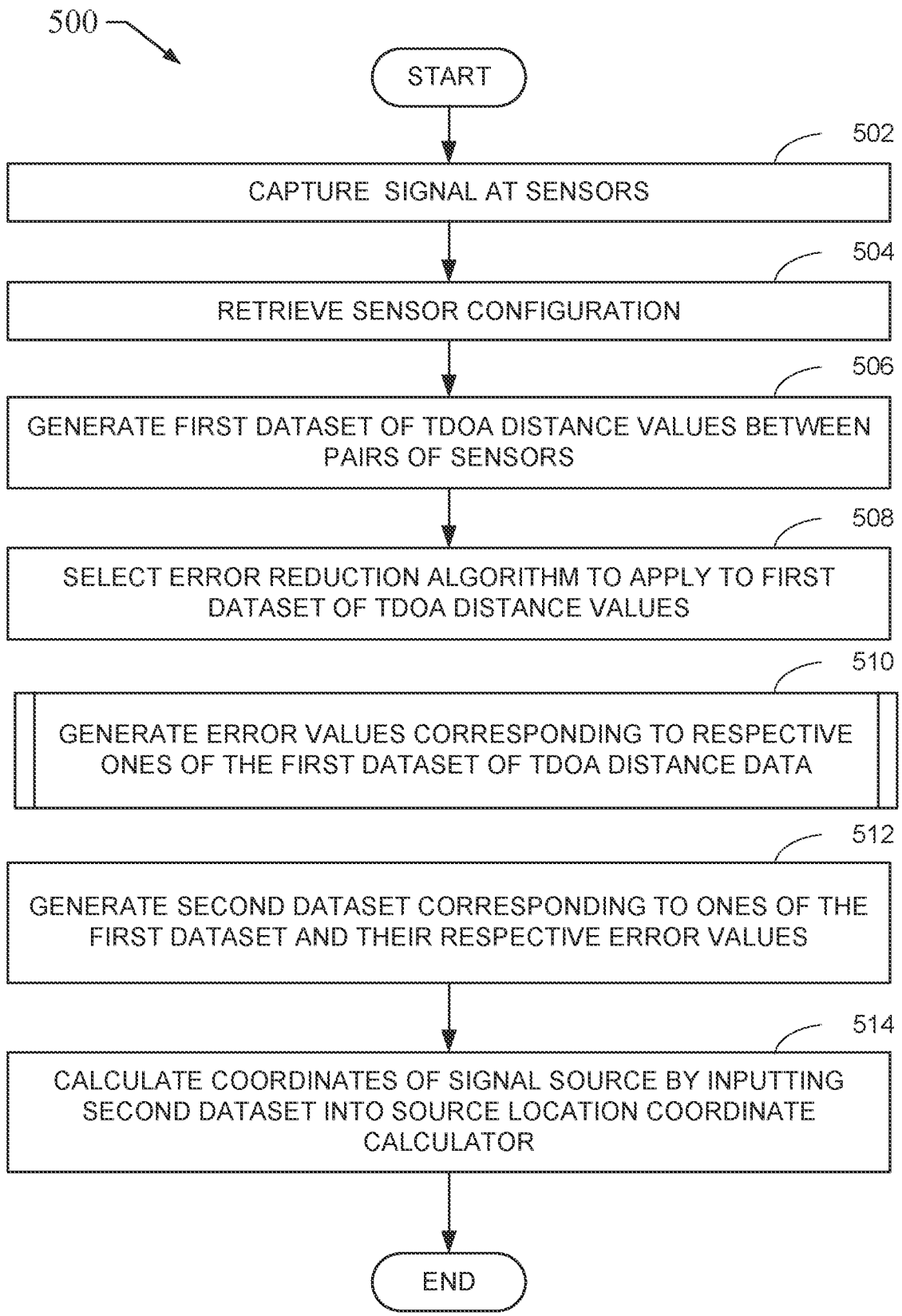
FIG. 5 is a flowchart representative of example machine readable instructions that may be executed by example processor circuitry to implement the source location system of FIG. 1 and/or FIG. 2
Figure 6:
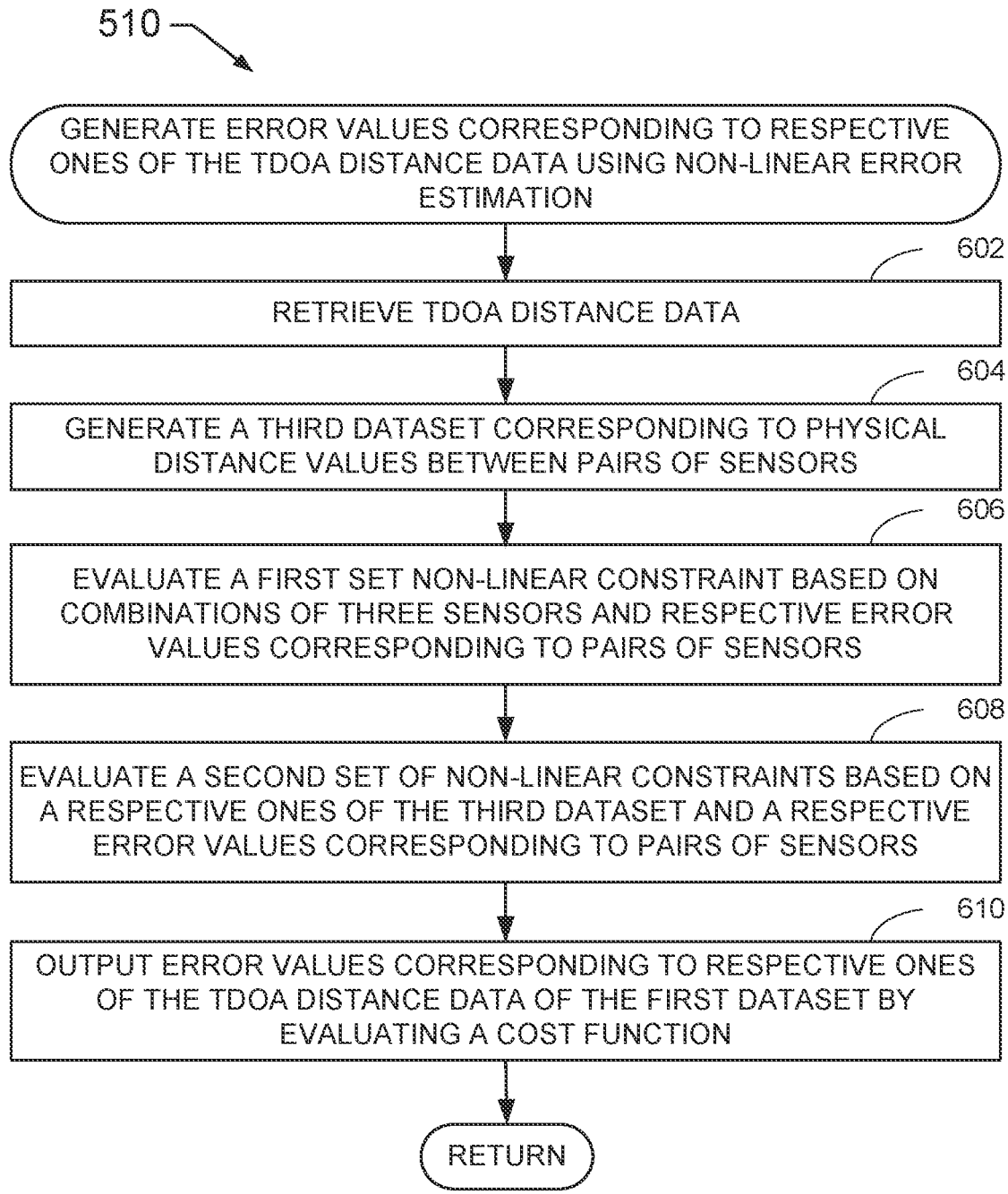
FIG. 6 is a flowchart representative of example machine readable instructions that may be executed by example processor circuitry to implement example non-linear error estimation circuitry included in the example source location system of FIG. 2.
Figure 7:
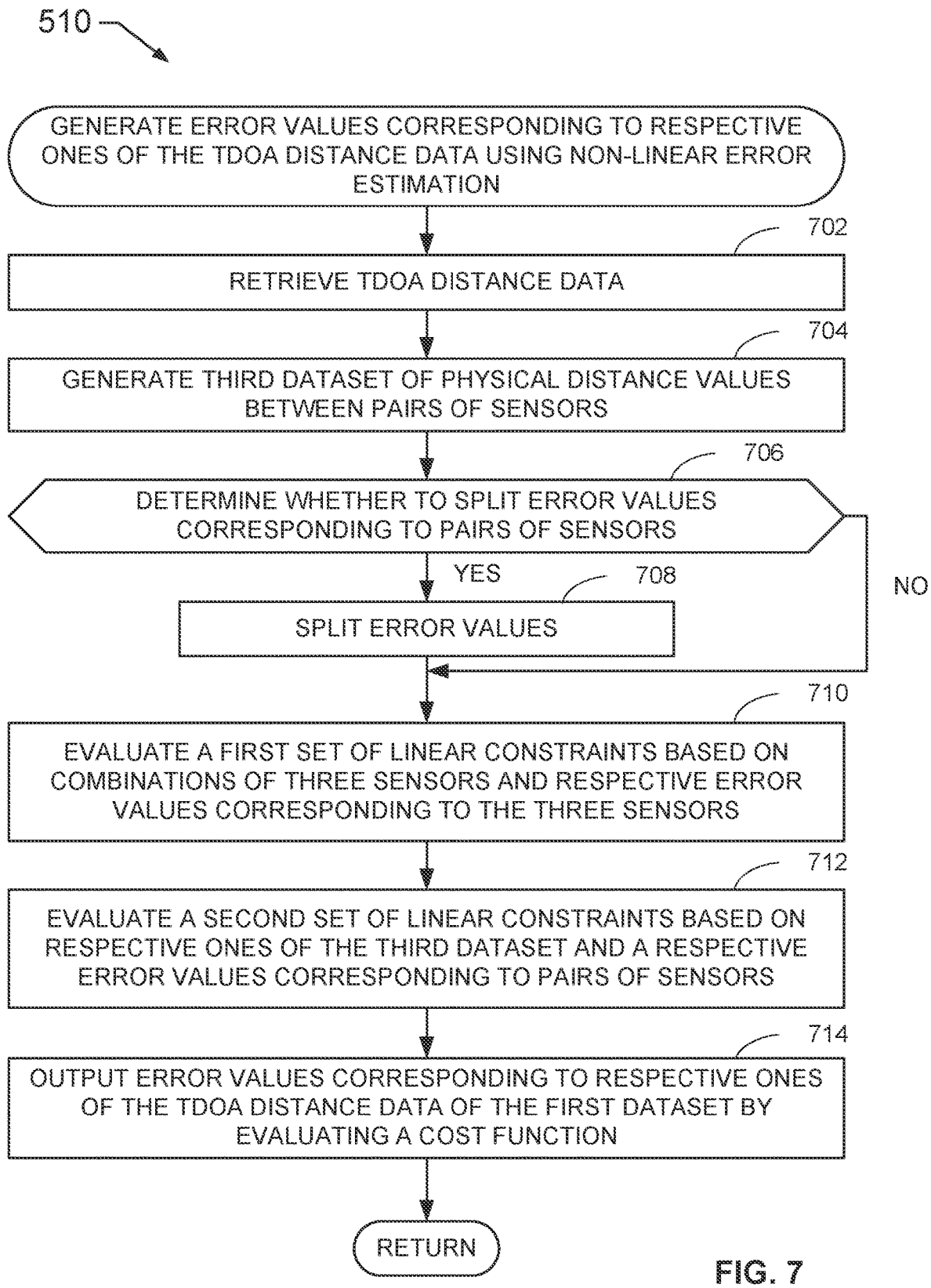
FIG. 7 is a flowchart representative of example machine readable instructions that may be executed by example processor circuitry to implement example linear error estimation circuitry included in the example source location system of FIG. 2.

Flowcharts representative of example hardware logic circuitry, machine readable instructions, hardware implemented state machines, and/or any combination thereof for implementing the source location system 112 of FIGS. 1 and 2 is shown in FIGS. 5-7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program(s) may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program(s) and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program(s) is(are) described with reference to the flowcharts illustrated in FIGS. 5-7, many other methods of implementing the example source location system 112 of FIG. 1 and FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multicore CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5-7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed and/or instantiated by processor circuitry to estimate a location of an audio source (e.g., audio source 102) using signal sensors. The machine readable instructions and/or operations 500 of FIG. 5 begin at block 502, at which the example sensor circuitry (e.g., sensor circuitry 114) captures a signal emitted by the audio source 102 at multiple sensors (e.g., sensors 104-110). At block 504, the TDOA distance calculator 208 retrieves a sensor configuration of the sensor 104-110 from the sensor configuration storage 210. At block 506, the example TDOA distance calculator 208 calculates TDOA distance values between pairs of the sensors 104-110. The TDOA distance data generator 116 generates a first dataset of the calculated TDOA distance values between pairs of the sensors 104-110.

At block 508, the example error estimation algorithm selector 220 selects an error reduction algorithm to apply to the first dataset of TDOA distance values. Based on the algorithm selected at block 508, either the non-linear error estimation circuitry 222 (described below in FIG. 6) or the linear error estimation circuitry 224 (described below in FIG. 7) is applied to the first dataset to generate error values corresponding to respective ones of the first dataset of TDOA distance data (block 510). At block 512, the example error adjusted TDOA distance data calculator 238 receives the generated error values and generates a second dataset corresponding to ones of the first dataset and their respective error values. At block 514, the method includes calculating coordinates of the signal source by inputting the second dataset into the example source location coordinate calculator 246.

FIG. 6 is a flowchart representative of example machine readable instructions and/or example operations 510 that may be executed and/or instantiated by processor circuitry to implement the error reduction circuitry 118 and, more specifically, the non-linear error estimation circuitry 222 of FIG. 2. The operations 512 begin at block 602, where the non-linear error estimation circuitry 222 retrieves TDOA distance data from the example TDOA distance data storage 218. At block 604, the example physical distance data generator 236 generates a third dataset corresponding to physical distance values between pairs of the sensors. In doing so, the physical distance data generator 236 retrieves a configuration of the sensors 104-110 from the sensor configuration storage 210, as described above. With a known configuration of the sensors, the physical distance data generator 236 is able to deduce a physical distance value between the pairs of sensor 104-110. At blocks 606 and 608, respectively, the non-linear constraint evaluation circuitry 226 evaluates a first set of non-linear constraints based on combinations of three sensors and respective error values corresponding to pairs of sensors and evaluates a second set of non-linear constraints based on respective ones of the third dataset and respective ones of the error values corresponding to the respective pairs of sensor. For example, a first set of non-linear constraints that can be evaluated at block 606 are described above in the context of equations 3-11 and a second set of non-linear constraints that can be evaluated at block 608 are described above in the context of equation 12. At block 610, the non-linear cost evaluation circuitry 228 outputs error values corresponding to respective ones of the TDOA distance data of the first dataset by evaluating a cost function for each sensor pair. For example, a non-linear cost function that can be evaluated at block 610 is described above in the context of equation 13.

FIG. 7 is a flowchart representative of example machine readable instructions and/or example operations 512 that may be executed and/or instantiated by processor circuitry to implement the error reduction circuitry 118 and, more specifically, the linear error estimation circuitry 224 of FIG. 2. The operations 512 begin at block 702. The linear error estimation circuitry 224 retrieves TDOA distance data from the example TDOA distance data storage 218. At block 704, the example physical distance data generator 236 generates a third dataset corresponding to physical distance values between pairs of sensor. As noted above, the physical distance data generator 236 generates the third dataset by accessing a configuration of the sensors from the sensor configuration storage 210 and calculating the physical distance values based on the known sensor configuration. At block 706, the linear error estimation circuitry 224 determines whether to split respective error variables corresponding to respective error values. If the answer to block 706 is YES, the example error splitter 234 splits respective error variables for the first and second sets of constraints and for the cost function. For example, an error value may be split as described above by applying equation 2. The method then moves on to block 710. If the answer to block 706 is NO, the method moves on to block 710. At block 710, the linear constraint evaluation circuitry 230 evaluates a first set of linear constraints based on combinations of three sensors and respective error values corresponding to pairs of sensors. For example, a first set of linear constraints that can be evaluated at block 710 are described above in the context of equations 3-11. At block 712, the linear constraint evaluation circuitry 230 evaluates a second set of linear constraints based on respective ones of the third dataset and respective ones of the error values corresponding to the respective pairs of sensor. For example, a second set of linear constraints that can be evaluated at block 712 are described above in the context of equation 12. At block 714, the linear cost evaluation circuitry 232 outputs error values corresponding to respective ones of the TDOA distance data of the first dataset by evaluating a cost function. For example, a linear cost function that can be evaluated at block 714 is described above in the context of equation 14.

Figure 8:
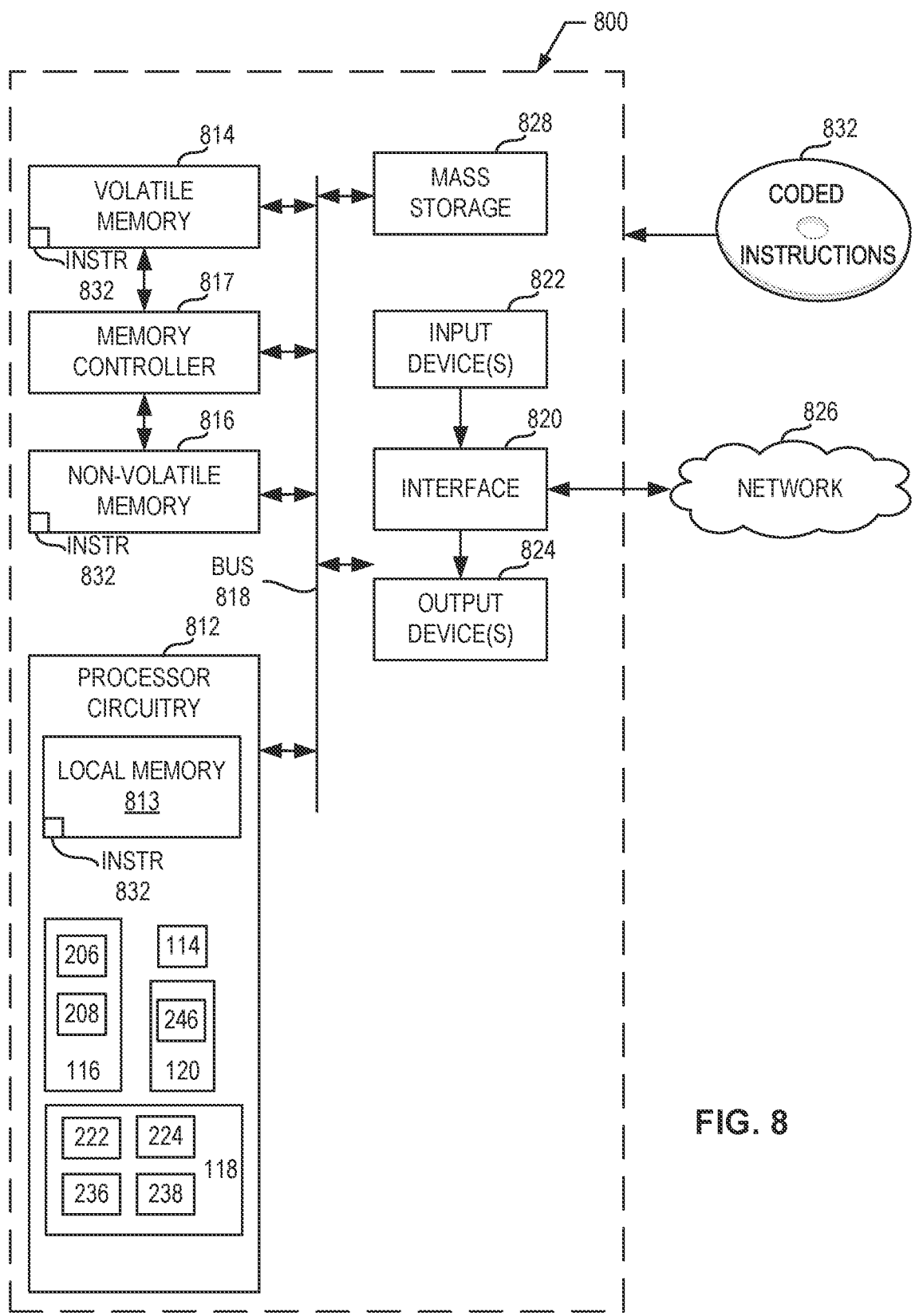
FIG. 8 is a block diagram of an example processing platform including processor circuitry structured to execute the example machine readable instructions of FIGS. 5, 6 and/or 7 to implement the source location system of FIGS. 1 and/or 2.

FIG. 8 is a block diagram of an example processor platform 800 structured to execute and/or instantiate the machine readable instructions and/or operations of FIGS. 5-7 to implement the source location system 112 as illustrated in FIGS. 1 and 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example TDOA calculator 206, the example TDOA distance calculator 208, the example TDOA distance data transmitter 214, the example signal data retriever 216, the example error estimation algorithm selector, the example non-linear error estimation circuitry 222, the example linear error estimation circuitry 224, the example non-linear constraint evaluation circuitry 226, the example non-linear cost evaluation circuitry 228, the example linear error estimation circuitry 224, the example linear constraint evaluation circuitry 230, the example linear cost evaluation circuitry 232, the example error splitter 234, the example physical distance data generator 236, the example error adjusted TDOA distance data calculator 238, the example source location coordinate calculator 246, and/or, more generally, the example sensor circuitry 114, the example TDOA distance data generator 116, the example error reduction circuitry 118, the example source location circuitry 120, and/or, more generally, the example source location system 112.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817. In some examples, the example signal data storage 202, the example sensor configuration storage 210, the example signal propagation speed storage 212, the example TDOA distance data storage 218, the example error adjusted TDOA distance data storage 240, the example source location algorithm database 248, and the example source location data storage 250 can all be implemented by one or more of the above-identified memory devices.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, a sensor(s), a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIGS. 5-7 may be stored in the mass storage device 828, in the volatile memory 814, in the non-volatile memory 816, and/or on a removable non-transitory computer readable storage medium such as a CD or DVD.

Figure 9:
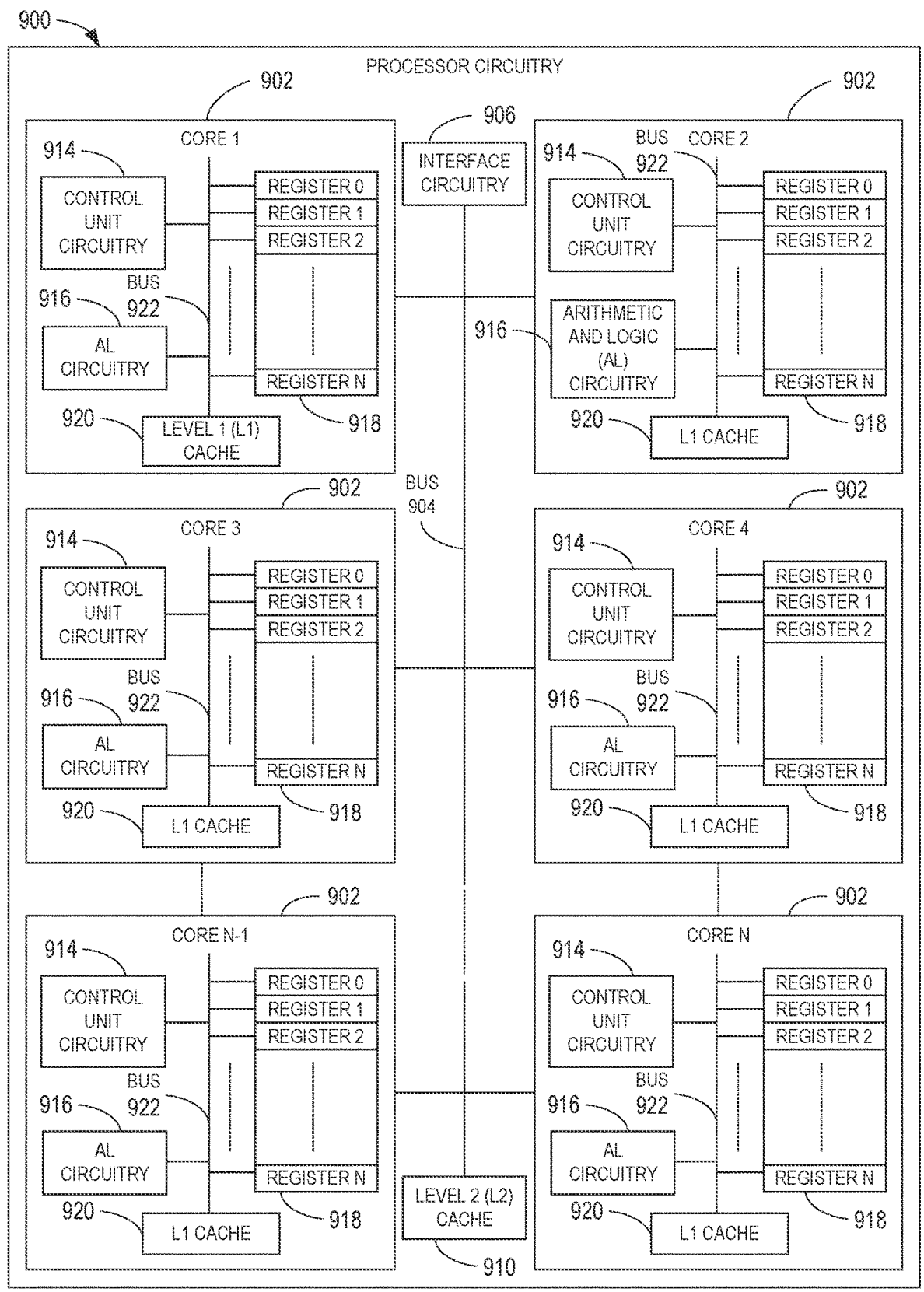
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 5-7.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 922 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
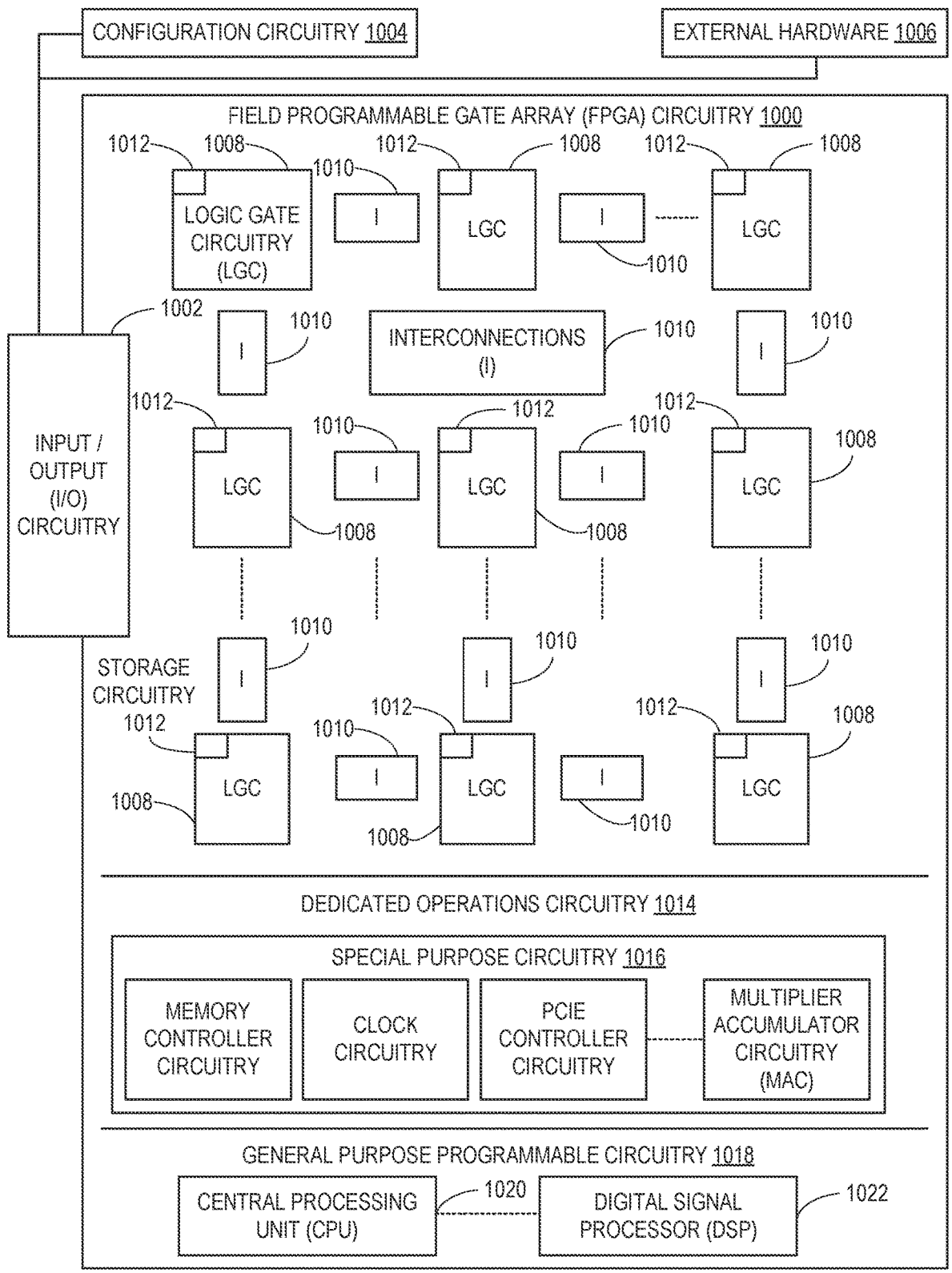
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions.

However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 5-7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 5-7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 5-7. As such, the FPGA circuitry 1000 may be structured to effectively instantiate some or all of the machine readable instructions of the flowcharts of FIGS. 5-7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 5-7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 5-7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an onboard CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 5-7 may be executed by one or more of the cores 902 of FIG. 9 and a second portion of the machine readable instructions represented by the flowcharts of FIGS. 5-7 may be executed by the FPGA circuitry 1000 of FIG. 10.

In some examples, the processor circuitry 812 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
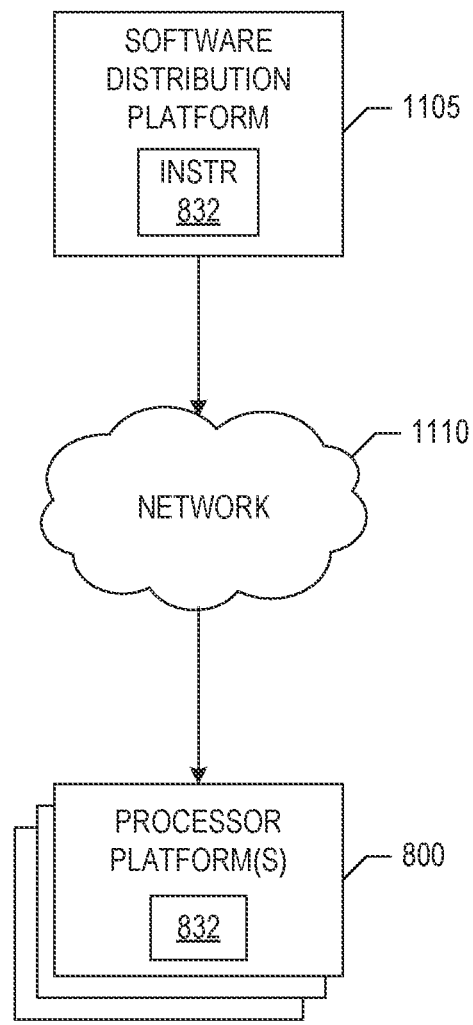
FIG. 11 is a block diagram of an example software distribution platform (e.g., one or more servers) to distribute software (e.g., software corresponding to the example machine readable instructions of FIGS. 5-7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions 500-700 of FIGS. 5-7, as described above. The one or more servers of the example software distribution platform 1105 are in communication with a network 1110, which may correspond to any one or more of the Internet and/or any of the example networks 826 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 500-700 of FIGS. 5-7, may be downloaded to the example processor platform 800, which is to execute the machine readable instructions 832 to implement the error reduction circuitry 118. In some example, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

From the foregoing, it will be appreciated that example systems, methods, apparatus, and articles of manufacture have been disclosed that determine a location of a signal source. The disclosed system, methods, apparatus, and articles of manufacture improve the accuracy of determining a location of a signal source in an environment in which the location is otherwise unknown. The disclosed system, methods, apparatus, and articles of manufacture improve the accuracy of determining a location of a signal source in an environment which is loud, noisy, and/or reverberates a signal. The disclosed systems, methods, apparatus, and articles of manufacture makes use of information provided by multiple sensors to generate a first dataset of TDOA distance values. The disclosed systems, methods, apparatus, and articles of manufacture apply linear programming and/or non-linear programming to the first dataset to generate error values corresponding to respective ones of the TDOA distance values based on a cost function, a first set of constraints, and a second set of constraints. The disclosed systems, methods, apparatus, and articles of manufacture generate a second dataset of error-adjusted TDOA distance values corresponding to ones of the TDOA distance values and respective ones of the error values. The disclosed systems, methods, apparatus, and articles of manufacture determine coordinates of the signal source location by inputting the error adjusted TDOA distance data into a source location algorithm.

Example methods, apparatus, systems, and articles of manufacture to determine a location of a signal source are disclosed herein. Further examples and combinations thereof include the following:

Example 1 includes an apparatus to determine a location of an audio source, the apparatus comprising at least one memory, instructions in the apparatus, and processor circuitry to execute the instructions to determine respective error values for corresponding ones of a first dataset of time difference of arrival (TDOA) distance values between pairs of acoustic sensors, the error values based on a cost function, a first set of constraints and a second set of constraints, adjust the corresponding ones of the first dataset of TDOA distance values based on the respective error values to determine a second dataset of TDOA distance values, and output the second dataset of TDOA distance values to source location circuitry that is to determine the location of the audio source.

Example 2 includes the apparatus of example 1, wherein the processor circuitry is to generate the first dataset of TDOA distance values based on calculated TDOA values multiplied by a propagation speed of the acoustic signal, a first one of the TDOA values to represent a difference in arrival time of an audio signal received at a first acoustic sensor and a second acoustic sensor, a corresponding first one of the TDOA distance values to represent a first delay distance between the first acoustic sensor and the second acoustic sensor.

Example 3 includes the apparatus of any of examples 1-2, wherein a number of acoustic sensors is at least four, and the first dataset is to include TDOA distance values for respective ones of the pairs of acoustic sensors among the at least four acoustic sensors.

Example 4 includes the apparatus of example 3 wherein the processor circuitry is to receive audio signal data from the at least four sensors and access configuration data that specifies physical locations of the at least four sensors, and generate a third dataset based on the physical locations specified in the sensor configuration data, the third dataset to include physical distance values between respective pairs of acoustic sensors.

Example 5 includes the apparatus of any of examples 1-4, wherein respective ones of the first set of constraints are based on combinations of three TDOA distance values and respective ones of the second set of constraints are based on the physical distance values between the respective pairs of acoustic sensors.

Example 6 includes the apparatus of example 5, wherein a first one of the first set of constraints is based on a combination of a first one of the TDOA distance values corresponding to a first delay distance between a first acoustic sensor and a second acoustic sensor, a second one of the TDOA distance values corresponding to a second delay distance between the first acoustic sensor and a third acoustic sensor, and a third one of the TDOA distance values corresponding to a third delay distance between the third acoustic sensor and the second acoustic sensor, and a combination of a first one of the error values corresponding to the first one of the TDOA values, a second one of the error values corresponding to the second one of the TDOA values, and a third one of the error values corresponding to the third one of the TDOA values.

Example 7 includes the apparatus of example 5, wherein a first one of the second set of constraints is based on a first combination of a first one of the physical distance values corresponding to a first physical distance between a first acoustic sensor and a second acoustic sensor and a first one of the TDOA distance values corresponding to a first delay distance between the first acoustic sensor and the second acoustic sensor, a first one of the error values corresponding to the first one of the TDOA distance data, and a second combination of the first one of the physical distance values and the first one of the TDOA distance values.

Example 8 includes the apparatus of any of examples 1-7, wherein the processor circuitry is to select at least one of a linear programming algorithm or a non-linear programming algorithm to determine the respective error values for the corresponding ones of the TDOA distance values based on the cost function, the first set of constraints and the second set of constraints.

Example 9 includes the apparatus of example 8, wherein when the linear programming algorithm is selected, the processor circuitry is to split respective ones of the error values into corresponding pairs of component error values.

Example 10 includes the apparatus of any of examples 1-9, wherein to adjust the corresponding ones of the first dataset of TDOA distance values, the processor circuitry is to add the respective error values to the corresponding ones of the first dataset of TDOA distance values to determine the second dataset of TDOA distance values.

Example 11 includes a method to identify a location of an audio source, the method comprising determining, by executing an instruction with at least one processor, respective error values for corresponding ones of a first dataset of time difference of arrival (TDOA) distance values between pairs of acoustic sensors, the error values based on a cost function, a first set of constraints and a second set of constraints, adjusting, by executing an instruction with at least one processor, the corresponding ones of the first dataset of TDOA distance values based on the respective error values to determine a second dataset of TDOA distance values, and outputting the second dataset of TDOA distance values to source location circuitry that is to determine the location of the audio source.

Example 12 includes the method of example 11, wherein the first dataset of TDOA distance values is generated based on calculated TDOA values multiplied by a speed of sound, a first one of the TDOA values to represent a difference in arrival time of an audio signal received at a first acoustic sensor and a second acoustic sensor, a corresponding first one of the TDOA distance values to represent a first delay distance between the first acoustic sensor and the second acoustic sensor.

Example 13 includes the method of any of example 11-12, wherein a number of acoustic sensors is at least four, and the first dataset is to include TDOA distance values for respective ones of the pairs of acoustic sensors among the at least four acoustic sensors.

Example 14 includes the method of example 13, further including receiving audio signal data from the at least four sensors and accessing configuration data that specifies physical locations of the at least four sensors, and generating a third dataset based on the physical locations specified in the sensor configuration data, the third dataset to include physical distance values between respective pairs of acoustic sensors.

Example 15 includes the method of any of examples 11-14, wherein respective ones of the first set of constraints are based on combinations of three TDOA distance values and respective ones of the second set of constraints are based on the physical distance values between the respective pairs of acoustic sensors Example 16 includes the method of example 15, wherein a first one of the first set of constraints is based on a combination of a first one of the TDOA distance values corresponding to a first delay distance between a first acoustic sensor and a second acoustic sensor, a second one of the TDOA distance values corresponding to a second delay distance between the first acoustic sensor and a third acoustic sensor, and a third one of the TDOA distance values corresponding to a third delay distance between the third acoustic sensor and the second acoustic sensor, and a combination of a first one of the error values corresponding to the first one of the TDOA values, a second one of the error values corresponding to the second one of the TDOA values, and a third one of the error values corresponding to the third one of the TDOA values.

Example 17 includes the method of example 15, wherein a first one of the second set of constraints is based on a first combination of a first one of the physical distance values corresponding to a first physical distance between a first acoustic sensor and a second acoustic sensor and a first one of the TDOA distance values corresponding to a first delay distance between the first acoustic sensor and the second acoustic sensor, a first one of the error values corresponding to the first one of the TDOA distance data, and a second combination of the first one of the physical distance values and the first one of the TDOA distance values.

Example 18 includes the method of any of examples 11-17, further including selecting at least one of a linear programming algorithm or a non-linear programming algorithm to determine the respective error values for the corresponding ones of the TDOA distance values based on the cost function, the first set of constraints and the second set of constraints.

Example 19 includes the method of example 18, wherein when the linear programming algorithm is selected, the method further including splitting respective ones of the error values into corresponding pairs of component error values.

Example 20 includes the method of any of examples 11-19, wherein adjusting the corresponding ones of the first dataset of TDOA distance values includes adding the respective error values to the corresponding ones of the first dataset of TDOA distance values to determine the second dataset of TDOA distance values.

Example 21 includes at least one non-transitory computer readable medium comprising computer readable instruction that, when executed, cause the at least one processor to at least determine respective error values for corresponding ones of a first dataset of time difference of arrival (TDOA) distance values between pairs of acoustic sensors, the error values based on a cost function, a first set of constraints and a second set of constraints, adjust the corresponding ones of the first dataset of TDOA distance values based on the respective error values to determine a second dataset of TDOA distance values, and output the second dataset of TDOA distance values to source location circuitry that is to determine the location of the audio source.

Example 22 includes the at least one non-transitory computer readable medium of example 21, wherein the computer readable instructions further cause the at least one processor to generate the first dataset of TDOA distance values based on calculated TDOA values multiplied by a propagation speed of the acoustic signal, a first one of the TDOA values to represent a difference in arrival time of an audio signal received at a first acoustic sensor and a second acoustic sensor, a corresponding first one of the TDOA distance values to represent a first delay distance between the first acoustic sensor and the second acoustic sensor.

Example 23 includes the at least one non-transitory computer readable medium of any of examples 21-22, wherein a number of acoustic sensors is at least four, and the first dataset is to include TDOA distance values for respective ones of the pairs of acoustic sensors among the at least four acoustic sensors.

Example 24 includes the at least one non-transitory computer readable medium of example 23, wherein the computer readable instructions further cause the at least one processor to receive audio signal data from the at least four sensors and access configuration data that specifies physical locations of the at least four sensors, and generate a third dataset based on the physical locations specified in the sensor configuration data, the third dataset to include physical distance values between respective pairs of acoustic sensors.

Example 25 includes the at least one non-transitory computer readable medium of any of examples 21-24, wherein respective ones of the first set of constraints are based on combinations of three TDOA distance values and respective ones of the second set of constraints are based on the physical distance values between the respective pairs of acoustic sensors.

Example 26 includes the at least one non-transitory computer readable medium of example 25, wherein a first one of the first set of constraints is based on a combination of a first one of the TDOA distance values corresponding to a first delay distance between a first acoustic sensor and a second acoustic sensor, a second one of the TDOA distance values corresponding to a second delay distance between the first acoustic sensor and a third acoustic sensor, and a third one of the TDOA distance values corresponding to a third delay distance between the third acoustic sensor and the second acoustic sensor, and a combination of a first one of the error values corresponding to the first one of the TDOA values, a second one of the error values corresponding to the second one of the TDOA values, and a third one of the error values corresponding to the third one of the TDOA values.

Example 27 includes the at least one non-transitory computer readable medium of example 25, wherein a first one of the second set of constraints is based on a first combination of a first one of the physical distance values corresponding to a first physical distance between a first acoustic sensor and a second acoustic sensor and a first one of the TDOA distance values corresponding to a first delay distance between the first acoustic sensor and the second acoustic sensor, a first one of the error values corresponding to the first one of the TDOA distance data, and a second combination of the first one of the physical distance values and the first one of the TDOA distance values.

Example 28 includes the at least one non-transitory computer readable medium of any of examples 21-27, wherein the computer readable instructions further cause the at least one processor to select at least one of a linear programming algorithm or a non-linear programming algorithm to determine the respective error values for the corresponding ones of the TDOA distance values based on the cost function, the first set of constraints and the second set of constraints.

Example 29 includes the at least one non-transitory computer readable medium of example 28, wherein when the linear programming algorithm is selected, the computer readable instructions further cause the at least one processor to split respective ones of the error values into corresponding pairs of component error values.

Example 30 includes the at least one non-transitory computer readable medium of any of examples 21-29, wherein to adjust the corresponding ones of the first dataset of TDOA distance values, the computer readable instructions further cause the at least one processor to add the respective error values to the corresponding ones of the first dataset of TDOA distance values to determine the second dataset of TDOA distance values.

Example 31 includes an apparatus to adjust a time difference of arrival (TDOA) value, the apparatus comprising interface circuitry to access signal data, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations or the third operations to instantiate at least one of non-linear error estimation circuitry or linear error estimation circuitry to determine respective error values for corresponding ones of a first dataset of time difference of arrival (TDOA) distance values between pairs of sensors, the error values based on a cost function, a first set of constraints and a second set of constraints, and an error adjusted TDOA distance data calculator to adjust the corresponding ones of the first dataset of TDOA distance values based on the respective error values to determine a second dataset of TDOA distance values.

Example 32 includes the apparatus of example 31, further including a source location coordinate calculator to determine the location of the signal source.

Example 33 includes the apparatus of any of examples 31-32, further including a TDOA distance data generator to generate the first dataset of TDOA distance values between the pairs of sensors, the first dataset of TDOA distance values based on calculated TDOA values multiplied by a propagation speed of the signal, a first one of the TDOA values to represent a difference in arrival time of a signal received at a first sensor and a second sensor, a corresponding first one of the TDOA distance values to represent a first delay distance between the first sensor and the second sensor.

Example 34 includes the apparatus of any of examples 31-33, wherein the number of sensors is at least four, and the TDOA distance values include TDOA distance values for respective ones of the pairs of sensor among the at least four sensors.

Example 35 includes the apparatus of example 34, further including a physical distance data generator to access configuration data that specifies physical locations of the at least four sensors, and generate a third dataset based on the physical locations specified in the sensor configuration data, the third dataset to include physical distance values between respective pairs of signal sensors.

Example 36 includes the apparatus of example 35, wherein respective ones of the first set of constraints are based on combinations of three TDOA distance values and respective ones of the second set of constraints are based on the physical distances between the respective pairs of signal sensors.

Example 37 includes the apparatus of any of examples 31-36, further including an error estimation algorithm selector to select one of the at least one of non-linear error estimation circuitry or the linear error estimation circuitry.

Example 38 includes the apparatus of any of examples 31-37, wherein the error adjusted TDOA distance data calculator is to adjust the corresponding ones of the first dataset of TDOA by adding the respective error values to the corresponding ones of the first dataset of TDOA distance values to determine the second dataset of TDOA distance values.

The following claims are hereby incorporated into this Detailed Description by this reference, with each claim standing on its own as a separate embodiment of the present disclosure.

What is claimed is:

1. An apparatus to determine a location of an audio source, the apparatus comprising:
   at least one memory;
   machine readable instructions; and
   at least one programmable circuit to be programmed by the machine readable instructions to:
      before determination of the location of the audio source, determine error values corresponding respectively to first time difference of arrival (TDOA) distance values between different pairs of acoustic sensors in a plurality acoustic sensors, the error values based on a cost function, a first set of constraints associated with respective groups of three of the pairs of acoustic sensors, and a second set of constraints associated with individual ones of the pairs of acoustic sensors;
      before determination of the location of the audio source, adjust ones of the first TDOA distance values based on corresponding ones of the error values to determine second TDOA distance values, a first one of the second TDOA distance values based on a first one of the first TDOA distance values and a first one of the error values that corresponds to the first one of the first TDOA distance values; and
      output the second TDOA distance values to source location circuitry that is to determine the location of the audio source.

2. The apparatus of claim 1, wherein one or more of the at least one programmable circuit is to generate the first TDOA distance values based on calculated TDOA values multiplied by a propagation speed of an acoustic signal, a first one of the TDOA values to represent a difference in an arrival time of an audio signal at a first acoustic sensor and an arrival time of the audio signal at a second acoustic sensor, a corresponding first one of the TDOA distance values to represent a first delay distance between the first acoustic sensor and the second acoustic sensor.

3. The apparatus of claim 1, wherein a number of acoustic sensors is at least four, and the first TDOA distance values are associated with respective ones of the pairs of acoustic sensors among the at least four acoustic sensors.

4. The apparatus of claim 3, wherein one or more of the at least one programmable circuit is to:
   obtain audio signal data from the at least four acoustic sensors and access configuration data that specifies physical locations of the at least four acoustic sensors; and
   generate a dataset based on the physical locations specified in the configuration data, the dataset to include physical distance values between respective ones of the pairs of acoustic sensors.

5. The apparatus of claim 4, wherein respective ones of the first set of constraints are based on combinations of three TDOA distance values and respective ones of the second set of constraints are based on the physical distance values between respective individual ones of the pairs of acoustic sensors.

6. The apparatus of claim 5, wherein a first one of the first set of constraints is based on:
   a combination of a first one of the TDOA distance values corresponding to a first delay distance between a first acoustic sensor and a second acoustic sensor, a second one of the TDOA distance values corresponding to a second delay distance between the first acoustic sensor and a third acoustic sensor, and a third one of the TDOA distance values corresponding to a third delay distance between the third acoustic sensor and the second acoustic sensor, the first acoustic sensor and the second acoustic sensor corresponding to a first one of the pairs of acoustic sensors, the first acoustic sensor and the third acoustic sensor corresponding to a second one of the pairs of acoustic sensors, and the third acoustic sensor and the second acoustic sensor corresponding to a third one of the pairs of acoustic sensors; and
   a combination of a first one of the error values corresponding to the first one of the TDOA distance values, a second one of the error values corresponding to the second one of the TDOA distance values, and a third one of the error values corresponding to the third one of the TDOA distance values.

7. The apparatus of claim 5, wherein a first one of the second set of constraints is based on:
   a first combination of a first one of the physical distance values corresponding to a first physical distance between a first acoustic sensor and a second acoustic sensor and a first one of the TDOA distance values corresponding to a first delay distance between the first acoustic sensor and the second acoustic sensor, the first acoustic sensor and the second acoustic sensor corresponding to a first one of the pairs of acoustic sensors;
   a first one of the error values corresponding to the first one of the TDOA distance values; and
   a second combination of the first one of the physical distance values and the first one of the TDOA distance values.

8. The apparatus of claim 1, wherein one or more of the at least one programmable circuit is to select at least one of a linear programming algorithm or a non-linear programming algorithm to determine the error values for the corresponding ones of the first TDOA distance values based on the cost function, the first set of constraints and the second set of constraints.

9. The apparatus of claim 8, wherein when the linear programming algorithm is selected, one or more of the at least one programmable circuit is to split respective ones of the error values into corresponding pairs of component error values.

10. The apparatus of claim 1, wherein to adjust the corresponding ones of the first TDOA distance values, one or more of the at least one programmable circuit is to add the error values to the corresponding ones of the TDOA distance values to determine the TDOA distance values.

11. The apparatus of claim 1, wherein the second set of constraints includes a constraint that an absolute value of a sum of the first one of the first TDOA distance values and the first one of the error values is less than or equal to a specified physical distance between a first one of the pairs of acoustic sensors, the first one of the pairs of acoustic sensors corresponding to the first one of the first TDOA distance values.

12. A method to identify a location of an audio source, the method comprising:
  determining, by at least one programmable circuit programmed based on at least one instruction, error values corresponding respectively to first time difference of arrival (TDOA) distance values between different pairs of acoustic sensors in a plurality acoustic sensors before determination of the location of the audio source, the error values based on a cost function, a first set of constraints associated with respective groups of three of the pairs of acoustic sensors, and a second set of constraints associated with individual ones of the pairs of acoustic sensors;
  adjusting, by one or more of the at least one programmable circuit, ones of the first TDOA distance values based on corresponding ones of the error values to determine second TDOA distance values before determination of the location of the audio source, a first one of the second TDOA distance values based on a first one of the first TDOA distance values and a first one of the error values that corresponds to the first one of the first TDOA distance values; and
  outputting the second TDOA distance values to source location circuitry that is to determine the location of the audio source.

13. The method of claim 12, wherein a number of acoustic sensors is at least four, and the first TDOA distance values are associated with respective ones of the pairs of acoustic sensors among the at least four acoustic sensors.

14. The method of claim 13, including:
  obtaining audio signal data from the at least four acoustic sensors and accessing configuration data that specifies physical locations of the at least four acoustic sensors; and
  generating a dataset based on the physical locations specified in the configuration data, the dataset including physical distance values between respective ones of the pairs of acoustic sensors.

15. The method of claim 14, wherein respective ones of the first set of constraints are based on combinations of three TDOA distance values and respective ones of the second set of constraints are based on the physical distance values between respective individual ones of the pairs of acoustic sensors.

16. The method of claim 15, wherein a first one of the first set of constraints is based on:
  a combination of a first one of the TDOA distance values corresponding to a first delay distance between a first acoustic sensor and a second acoustic sensor, a second one of the TDOA distance values corresponding to a second delay distance between the first acoustic sensor and a third acoustic sensor, and a third one of the TDOA distance values corresponding to a third delay distance between the third acoustic sensor and the second acoustic sensor, the first acoustic sensor and the second acoustic sensor corresponding to a first one of the pairs of acoustic sensors, the first acoustic sensor and the third acoustic sensor corresponding to a second one of the pairs of acoustic sensors, and the third acoustic sensor and the second acoustic sensor corresponding to a third one of the pairs of acoustic sensors; and
  a combination of a first one of the error values corresponding to the first one of the TDOA distance values, a second one of the error values corresponding to the second one of the TDOA distance values, and a third one of the error values corresponding to the third one of the TDOA distance values.

17. The method of claim 15, wherein a first one of the second set of constraints is based on:
  a first combination of a first one of the physical distance values corresponding to a first physical distance between a first acoustic sensor and a second acoustic sensor and a first one of the TDOA distance values corresponding to a first delay distance between the first acoustic sensor and the second acoustic sensor, the first acoustic sensor and the second acoustic sensor corresponding to a first one of the pairs of acoustic sensors;
  a first one of the error values corresponding to the first one of the TDOA distance values; and
  a second combination of the first one of the physical distance values and the first one of the TDOA distance values.

18. At least one non-transitory computer readable medium comprising computer readable instructions to cause at least one programmable circuit to at least:
  determine error values respectively corresponding to first time difference of arrival (TDOA) distance values between different pairs of acoustic sensors in a plurality acoustic sensors, the error values based on a cost function, a first set of constraints associated with respective groups of three of the pairs of acoustic sensors, and a second set of constraints associated with individual ones of the pairs of acoustic sensors;
  adjust ones of the first TDOA distance values based on corresponding ones of the error values to determine second TDOA distance values, a first one of the second TDOA distance values based on a first one of the first TDOA distance values and a first one of the error values that corresponds to the first one of the first TDOA distance values; and
  output the second TDOA distance values to source location circuitry that is to determine a location of an audio source.

19. The at least one non-transitory computer readable medium of claim 18, wherein a number of acoustic sensors is at least four, and the first TDOA distance values are associated with respective ones of the pairs of acoustic sensors among the at least four acoustic sensors.

20. The at least one non-transitory computer readable medium of claim 19, wherein the computer readable instructions further cause one or more of the at least one programmable circuit to:
  obtain audio signal data from the at least four acoustic sensors and access configuration data that specifies physical locations of the at least four acoustic sensors; and
  generate a dataset based on the physical locations specified in the configuration data, the dataset to include physical distance values between respective pairs of acoustic sensors.

21. The at least one non-transitory computer readable medium of claim 20, wherein respective ones of the first set of constraints are based on combinations of three TDOA distance values and respective ones of the second set of constraints are based on the physical distance values between respective individual ones of the pairs of acoustic sensors.

22. The at least one non-transitory computer readable medium of claim 18, wherein to adjust the corresponding ones of the first TDOA distance values, the computer readable instructions are to cause one or more of the at least one programmable circuit to add the error values to the corresponding ones of the TDOA distance values to determine the second TDOA distance values.

23. An apparatus comprising:
  interface circuitry to access signal data; and
  processor circuitry including one or more of:
    at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus;
    a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or
    Application Specific Integrate Circuitry (ASIC) including logic gate circuitry to perform one or more third operations;
  the processor circuitry to perform at least one of the first operations, the second operations or the third operations to:
    determine error values respectively corresponding to first time difference of arrival (TDOA) distance values between pairs of sensors in a plurality acoustic sensors, the error values based on a cost function, a first set of constraints associated with respective groups of three of the pairs of acoustic sensors, and a second set of constraints associated with individual ones of the pairs of acoustic sensors; and
    ones of the first TDOA distance values based on corresponding ones of the error values to determine second TDOA distance values, a first one of the second TDOA distance values based on a first one of the first TDOA distance values and a first one of the error values that corresponds to the first one of the first TDOA distance values.

24. The apparatus of claim 23, wherein the processor circuitry is to determine a location of an audio source based on the second TDOA distance values.

25. The apparatus of claim 23, wherein the processor circuitry is to generate the first TDOA distance values based on calculated TDOA values multiplied by a propagation speed of an acoustic signal, a first one of the TDOA values to represent a difference in an arrival time of a signal at a first sensor and an arrival time of the signal at a second sensor, a corresponding first one of the TDOA distance values to represent a first delay distance between the first sensor and the second sensor.

* * * * *